(12) United States Patent
Ebara et al.

(10) Patent No.: US 11,112,973 B2
(45) Date of Patent: Sep. 7, 2021

(54) COMPUTER SYSTEM AND DATA MANAGEMENT METHOD

(71) Applicant: Hitachi, Ltd., Tokyo (JP)

(72) Inventors: Hiroto Ebara, Tokyo (JP); Yoshinori Ohira, Tokyo (JP); Hideo Saito, Tokyo (JP); Masakuni Agetsuma, Tokyo (JP); Takeru Chiba, Tokyo (JP); Takahiro Yamamoto, Tokyo (JP)

(73) Assignee: HITACHI, LTD., Tokyo (JP)

( * ) Notice: Subject to any disclaimer, the term of this patent is extended or adjusted under 35 U.S.C. 154(b) by 51 days.

(21) Appl. No.: 16/558,460

(22) Filed: Sep. 3, 2019

(65) Prior Publication Data
US 2020/0301581 A1 Sep. 24, 2020

(30) Foreign Application Priority Data
Mar. 22, 2019 (JP) .............................. JP2019-054842

(51) Int. Cl.
*G06F 3/06* (2006.01)

(52) U.S. Cl.
CPC ............ *G06F 3/061* (2013.01); *G06F 3/0614* (2013.01); *G06F 3/0652* (2013.01); *G06F 3/0659* (2013.01); *G06F 3/0683* (2013.01)

(58) Field of Classification Search
CPC ...... G06F 3/061; G06F 3/0659; G06F 3/0652; G06F 3/0614; G06F 3/0683; G06F 3/0635; G06F 3/067
See application file for complete search history.

(56) References Cited

U.S. PATENT DOCUMENTS

| | | | | |
|---|---|---|---|---|
| 5,988,847 A | * | 11/1999 | McLaughlin | G05B 19/4185 700/9 |
| 10,359,967 B2 | | 7/2019 | Akutsu et al. | |
| 2011/0004732 A1 | * | 1/2011 | Krakirian | G06F 12/0817 711/147 |
| 2012/0166886 A1 | * | 6/2012 | Shankar | G06F 11/2028 714/43 |
| 2017/0097783 A1 | * | 4/2017 | Craddock | G06F 13/1689 |
| 2018/0004451 A1 | * | 1/2018 | Liu | G06F 3/0604 |

FOREIGN PATENT DOCUMENTS

WO 2018/029820 A1 2/2018

\* cited by examiner

*Primary Examiner* — Hiep T Nguyen
(74) *Attorney, Agent, or Firm* — Mattingly & Malur, PC

(57) ABSTRACT

A computer system includes a host unit that issues a request of an I/O processing to a volume VOL, a local pool control unit that is in charge of management of a local pool based on a storage area of a drive of one node, and a global pool control unit that is in charge of management of a global pool based on a plurality of local pools, wherein the global pool control unit controls transmission of target data of the I/O processing performed by the host unit based on a commonality relationship among a first node that is formed with the host unit performing the I/O processing, a second node that is formed with the global pool control unit, and a third node that is formed with the local pool control unit managing the local pool.

16 Claims, 23 Drawing Sheets

FIG. 6

NODE CONFIGURATION MANAGEMENT TABLE ~201

| NODE ID | (NODE ADDRESS) LIST | (RUNNING APPLICATION PROGRAM ID) LIST | BELONGING GLOBAL POOL ID |
|---|---|---|---|
| 0x0000 | [192.168.1.100] | [App_A, SDS] | 0x00 |
| 0x0001 | [192.168.1.101] | [App_B, SDS] | 0x00 |
| 0x0002 | [192.168.1.102] | [App_C, SDS] | 0x01 |
| ... | ... | ... | ... |

FIG. 7

DRIVE CONFIGURATION MANAGEMENT TABLE (NODE ID=0x0000) ~202

| DRIVE ID | PHYSICAL CAPACITY | BELONGING LOCAL POOL ID |
|---|---|---|
| 0x0000 | 10 TiB | 0x00 |
| 0x0001 | 10 TiB | 0x00 |
| 0x0002 | 20 TiB | 0x01 |
| ... | ... | ... |

FIG. 8

HOST PATH MANAGEMENT TABLE (GLOBAL POOL ID=0x00) ~203

| VOLUME ID | VOLUME OWNER NODE ID | (NODE ID OF HOST APPLICATION) LIST |
|---|---|---|
| 0x0000 | 0x0000 | [0x0000] |
| 0x0001 | 0x0001 | [0x0001] |
| ... | ... | ... |

FIG. 9

VOLUME MANAGEMENT TABLE (VOLUME ID=0x0000) ~204

| LOGICAL BLOCK ID | BLOCK SIZE | GLOBAL POOL ID | GLOBAL POOL PAGE ID |
|---|---|---|---|
| 0x00000000 | 0x400000 | 0x00 | 0x00000000 |
| 0x00000001 | 0x400000 | 0x00 | 0x00000001 |
| ... | ... | ... | ... |

FIG. 10

GLOBAL POOL MANAGEMENT TABLE (GLOBAL POOL ID=0x00) — 205

| GLOBAL POOL PAGE ID | PAGE SIZE | OWNER NODE ID | DATA PROTECTION SETTING | (NODE ID, LOCAL POOL ID, LOCAL POOL PAGE ID) LIST |
|---|---|---|---|---|
| 0x00000000 | 0x400000 | 0x0000 | Mirroring | [(0x0000, 0x00, 0x00), (0x0001, 0x00, 0x00)] |
| 0x00000001 | 0x400000 | 0x0000 | Mirroring | [(0x0000, 0x00, 0x01), (0x0001, 0x00, 0x01)] |
| ... | ... | ... | ... | ... |
| ... | ... | ... | ... | ... |

FIG. 11

LOCAL POOL MANAGEMENT TABLE (NODE ID=0X0000, LOCAL POOL ID=0x00) — 206

| LOCAL POOL PAGE ID | PAGE SIZE | DATA PROTECTION SETTING | (DRIVE ID, START ADDRESS, SIZE) LIST |
|---|---|---|---|
| 0x0000 | 0x20000000 | RAID0 | [(0x0000, 0x0, 0x10000000), (0x0001, 0x0, 0x10000000)] |
| 0x0001 | 0x20000000 | RAID1 | [(0x0000, 0x0, 0x10000000), (0x0001, 0x0, 0x10000000)] |
| ... | ... | ... | ... |

COMPUTER SYSTEM AND DATA MANAGEMENT METHOD

CROSS-REFERENCE TO RELATED APPLICATION

The present application claims priority from Japanese application JP 2019-054842, filed on Mar. 22, 2019, the contents of which is hereby incorporated by reference into this application.

BACKGROUND OF THE INVENTION

1. Field of the Invention

The present invention relates to a technique for managing data in a computer system including a plurality of physical nodes.

2. Description of the Related Art

A computer system configured with a plurality of nodes (physical computers: for example, general-purpose servers) including storage devices is known. In such a computer system, a Hyper-Converged Infrastructure (HCI) that constitutes a virtual host or a virtual storage in the same node, for example, with a hypervisor, a container, or the like is known.

Elements that execute an I/O processing of a host in the HCI include a host Virtual Machine (VM), a Software Defined Storage (SDS: logical area owner SDS) having an owner right to a logical data area (volume), and an SDS (physical area owner SDS) having an owner right to a physical data area (storage area of a drive).

In the HCI, for example, the host VM may be moved to another node in order to distribute the load of a microprocessor (MP) in the node. As a technique for moving the host VM, for example, a technique described in WO2018/029820 is known.

In addition, in order to eliminate the shortage of the storage capacity in the node, the logical area owner SDS or the physical area owner SDS that is in charge of the volume may be moved to the SDS of another node.

For example, in order to maintain a high performance of the I/O processing of the host in the HCI, it is preferable to arrange the host VM, and the logical area owner SDS or the physical area owner SDS in charge of target data of the I/O processing on the same node.

However, as described above, the host VM may be moved, or the logical area owner SDS and the physical area owner SDS that are in charge of the target data may be moved to an SDS of another node. In this case, since communication between the host VM, the logical area owner SDS, and the physical area owner SDS is communication between nodes, the performance of the I/O processing is degraded. In particular, when the host VM, the logical area owner SDS, and the physical area owner SDS are arranged in other nodes respectively, the number of times of communication between the nodes for transferring the target data of the I/O processing is increased, and the performance of the I/O processing is degraded.

Not limited to the HCI configuration, the same problem occurs when the host VM, the logical area owner SDS, and the physical area owner SDS are configured as different nodes.

SUMMARY OF THE INVENTION

The invention has been made in view of the above circumstances, and an object of the invention is to provide a technique that is capable of improving the performance of the I/O processing performed by the host in a computer system including a plurality of nodes.

In order to achieve the object, according to an aspect of the invention, there is provided a computer system including: a plurality of nodes; a host unit that is formed in at least one of the nodes and issues an I/O processing request to a predetermined data management unit; a plurality of local control units that are formed in a plurality of nodes each including a storage device providing a storage area to the data management unit, and that are in charge of management of a local logical area based on the storage area of the storage device of one node; and a global control unit that is formed in at least one of the nodes, and that is in charge of management of a global logical area based on a plurality of local logical areas allocated to the data management unit that is an I/O processing target of the host unit, wherein the global control unit controls transmission of target data of the I/O processing performed by the host unit with respect to the data management based on a commonality relationship among a first node that is formed with the host unit performing the I/O processing, a second node that is formed with the global control unit, and a third node that is formed with the local control unit managing the local logical area corresponding to the global logical area.

According to the invention, in the computer system including a plurality of nodes, the performance of the I/O processing performed by the host can be improved.

BRIEF DESCRIPTION OF THE DRAWINGS

FIG. 6 is a configuration diagram of a node configuration management table according to the embodiment.

FIG. 7 is a configuration diagram of a drive configuration management table according to the embodiment.

FIG. 8 is a configuration diagram of a host path management table according to the embodiment.

FIG. 9 is a configuration diagram of a volume management table according to the embodiment.

FIG. 10 is a configuration diagram of a global pool management table according to the embodiment.

FIG. 11 is a configuration diagram of a local pool management table according to the embodiment.

DESCRIPTION OF THE PREFERRED EMBODIMENTS

Embodiments will be described with reference to the drawings. It should be noted that the embodiments described below do not limit the invention according to the claims, and all of the elements and combinations thereof described in the embodiments are not necessarily essential to the solution to the problem.

In the following description, information may be described with the expression "AAA table". Alternatively, the information may be expressed with any data structure. That is, the "AAA table" may be referred to as "AAA information" to indicate that the information does not depend on the data structure.

Figure 1:
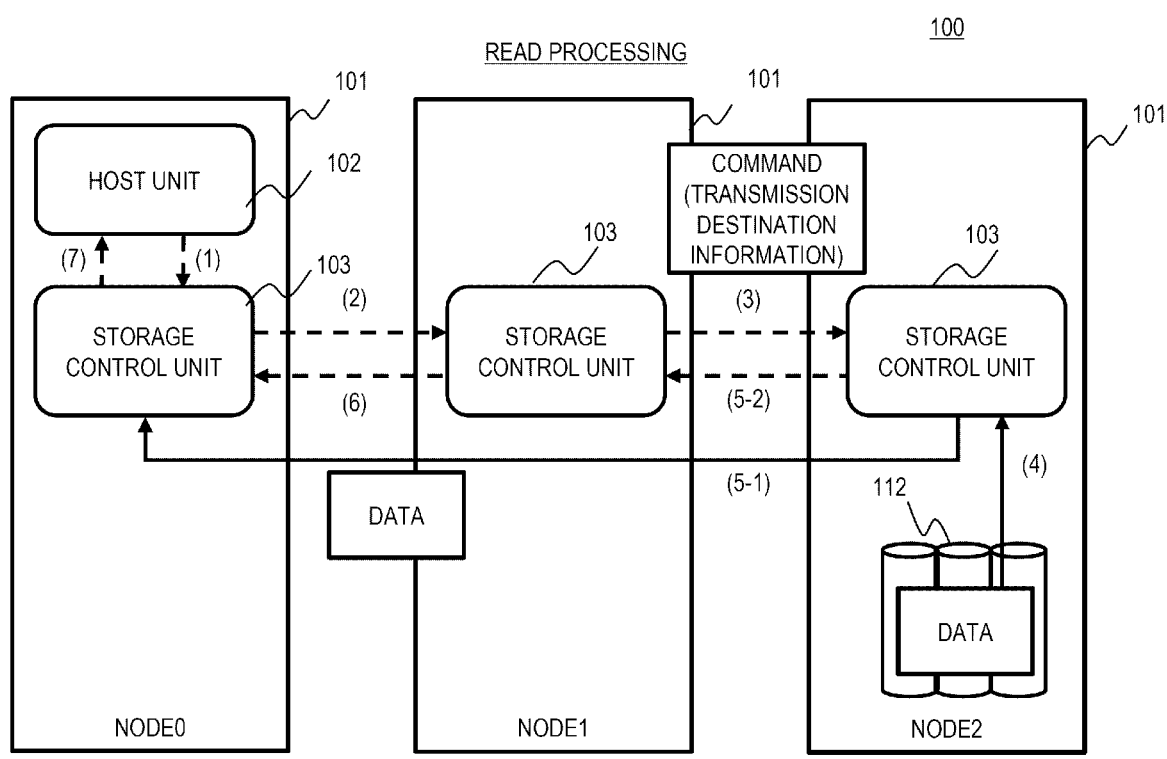
FIG. 1 is a diagram illustrating an overview of an example of a read processing according to an embodiment.

FIG. 1 is a diagram illustrating an overview of an example of a read processing according to an embodiment. Here, in FIG. 1, a solid line arrow indicates transmission of read target data, and a dotted arrow indicates transmission without the read target data, for example, transmission of a command.

In a computer system 100, a plurality of nodes 101 are connected via a network (for example, Ethernet (registered trademark), Infiniband, Fibre Channel (FC), PCI direct connection, and wireless) and clustered. The node 101 is configured with a physical computer (for example, a general-purpose server).

In the node 101, a host unit 102 is implemented by a processor executing a host program, and a storage control unit 103 is implemented by a processor executing a storage control program. In the example of FIG. 1, the host unit 102 and the storage control unit 103 can be configured to operate in one node using a technique such as a Hypervisor or a container. The host unit 102 and the storage control unit 103 may be configured to operate only in separate nodes.

When accessing permanent data on a drive (storage device) 112 from the host unit 102, an area of a virtualized data management unit (for example, volume, LU (logical unit), and object) provided by the storage control unit 103 is accessed. The storage control unit 103 includes a plurality of (four in the example of FIG. 3 to be described later) hierarchized control units. Each control unit has a right (owner right) to manage a resource (for example, a volume, a page (a global pool page, a local pool page)) and the like in the charge of each control unit. Therefore, in the storage control unit 103, communication is performed between the plurality of control units in order to implement data access performed by the host unit 102.

Here, a processing in a case where the host unit 102 of a node 0 reads data stored in the drive 112 of a node 2 will be described with reference to FIG. 1. Here, the storage control unit 103 of a node 1 has an owner right for a page (G pool page) of a global pool (an example of a global logical area, and referred to as G pool) allocated to a virtual volume that manages the data stored in the drive 112 of the node 2, that is, the storage control unit 103 of the node 1 is in charge of a processing.

First, the host unit 102 of the node 0 transmits a command (read command) corresponding to read target data (target data in the description of FIG. 1) to the storage control unit 103 of the node 0 ((1) in FIG. 1). Here, the command contains, for example, information about a volume in which the target data is managed, and data transmission destination information (information about the host unit 102 in the node 101, that is, the node 0).

The storage control unit 103 of the node 0 transmits the command to a storage control unit 103 (the storage control unit 103 of the node 1 in this example) in charge of the G pool page allocated to the volume corresponding to the command ((2) in FIG. 1).

The storage control unit 103 of the node 1, based on the received command, specifies a storage control unit 103 (in this example, the storage control unit 103 of the node 2) having an owner right to a page (L pool page) of a local pool (an example of a local logical area, referred to as L pool) corresponding to the G pool page, and transmits the command containing the data transmission destination information to the specified storage control unit 103 ((3) in FIG. 1). Here, the data transmission destination information is, for example, node information about the host unit 102 that has transmitted the read command.

The storage control unit 103 of the node 2 reads the target data from an area of the drive 112 corresponding to the L pool page, based on the command ((4) in FIG. 1).

Next, the storage control unit 103 of the node 2 transmits the read target data to the storage control unit 103 of the node 101 (node 0 in this example) indicated by the transmission destination information ((5-1) in FIG. 1), and transmits a response to the command to the storage control unit 103 of the node 1 that has transmitted the command ((5-2) in FIG. 1).

When the response to the command is received, the storage control unit 103 of the node 1 transmits the response to the command to the storage control unit 103 of the node 0, which is a command transmission source for the storage control unit 103 of the node 1 ((6) in FIG. 1).

The storage control unit 103 of the node 0 stores the target data transmitted from the node 2 in a memory or the like.

The storage control unit 103 of the node 0 receives the target data from the node 2, and notifies the host unit 102 of the response to the command ((7) in FIG. 1) when the response to the command is received from the node 1. This response may contain, for example, an address of the memory in which the target data is stored, or may contain the target data. With respect to a timing of receiving the read target data from the node 2 ((5-1) in FIG. 1) and a timing of the response to the command from the node 1 ((6) in FIG. 1), either may come first.

Accordingly, the host unit 102 can acquire the target data and use the target data for processing.

In the related art, the target data read in the node 2 is passed through the storage control unit of the node 1 which is a command transmission source, and is then transmitted to the storage control unit of the node 0. However, according to the present embodiment, as described above, the target data is transmitted from the node 2 directly to the storage control unit 103 of the node 0 without being passed through the node 1. Therefore, the number of times of transmission between the nodes can be reduced, the response time of the I/O processing performed by the host 102 can be shortened, and the performance of the I/O processing is improved.

The host unit 102 transmits the command to the storage control unit 103 in the own node in the example of FIG. 1. Alternatively, the host unit 102 may transmit the command to the node 1 that has the owner right to the volume in which the target data is stored.

Next, a processing in a case where the host unit 102 of the node 101 writes data will be described.

Figure 2:
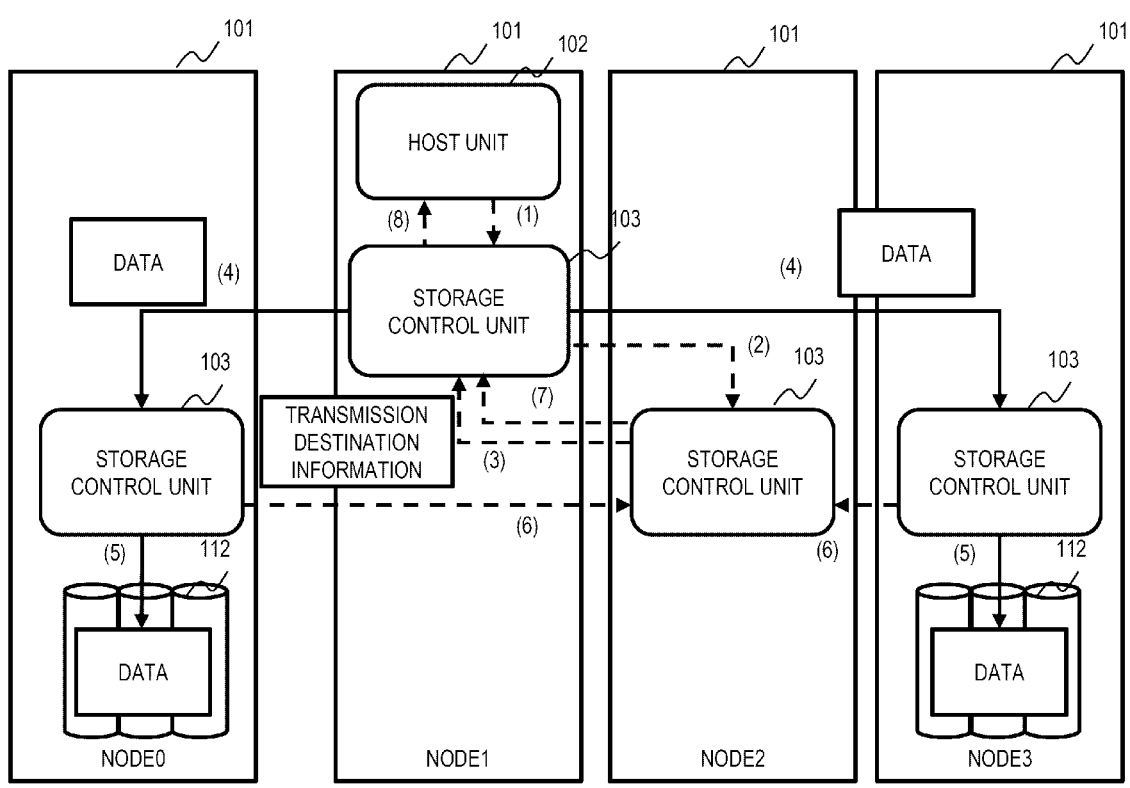
FIG. 2 is a diagram illustrating an overview of an example of a write processing according to the embodiment.

FIG. 2 is a diagram illustrating an overview of an example of a write processing according to the embodiment.

This example shows a case where the host unit 102 of the node 1 writes data. In this example, write target data (referred to as target data in the description of FIG. 2) is mirrored (duplicated) to the drive 112 of the node 0 and the drive 112 of the node 3 so as to be managed. The storage control unit 103 of the node 2 has an owner right to the G pool page allocated to the virtual volume that manages the target data, that is, the storage control unit 103 of the node 2 is in charge of a processing.

First, the host unit 102 of the node 1 transmits a command (write command) corresponding to the target data to the storage control unit 103 of the node 1 ((1) in FIG. 2). Here, the command contains, for example, information about a volume in which the write target data is managed, information about an area of a memory in which the target data is stored, and information about a node (node 1) of the host unit 102.

The storage control unit 103 of the node 1 transmits the same command to a storage control unit 103 (the storage control unit 103 of the node 2 in this example) in charge of the G pool page allocated to the volume corresponding to the command ((2) in FIG. 2).

The storage control unit 103 of the node 2 specifies a storage control unit 103 (the storage control units 103 of the node 0 and of the node 3 in this example) having an owner right to the L pool page corresponding to the G pool page based on the received command, and transmits a command containing transmission destination information indicating a node (node 0 and node 3 in this example) of the specified storage control unit 103 which is a data write destination ((3) in FIG. 2).

The storage control unit 103 of the node 1 transmits the command and the target data to a node (node 0 and node 3 in this example) corresponding to transfer destination information about the command received from the node 2 ((4) in FIG. 2). Here, the command contains information about the node 2 having the owner right to the G pool page, as information about a response destination corresponding to the command.

In the node 0 and the node 3, when receiving the command and the target data, the storage control unit 103 stores the target data in the drive 112 ((5) in FIG. 2), and transmits a response indicating that the write is completed to the node 2 having the owner right to the G page pool contained in the command ((6) in FIG. 2).

When receiving the response indicating that the write is completed from the storage control units 103 of the node 0 and of the node 3, the storage control unit 103 of the node 2 transmits the response to the storage control unit 103 of the node 1 which is a command request source ((7) in FIG. 2).

When receiving the response to the command from the node 2, the storage control unit 103 of the node 1 transmits a response indicating that the write has ended to the host unit 102 ((8) in FIG. 2). Accordingly, the host unit 102 can recognize that the write processing has been completed.

In the related art, the target data is passed through the storage control unit of the node 2, which is the command transmission destination, from the node 1 of the host unit 102, and is transferred to the storage control units of the node 0 and of the node 3. However, according to the present embodiment, as described above, the target data is transmitted from the node 1 directly to the storage control units of the node 0 and of the node 3, without being passed through the node 2. Therefore, the number of times of transmission of the target data between the nodes can be reduced, the response time of the I/O processing of the host 102 can be shortened, and the performance of the I/O processing is improved.

Next, the computer system according to the present embodiment will be described in detail.

Figure 3:
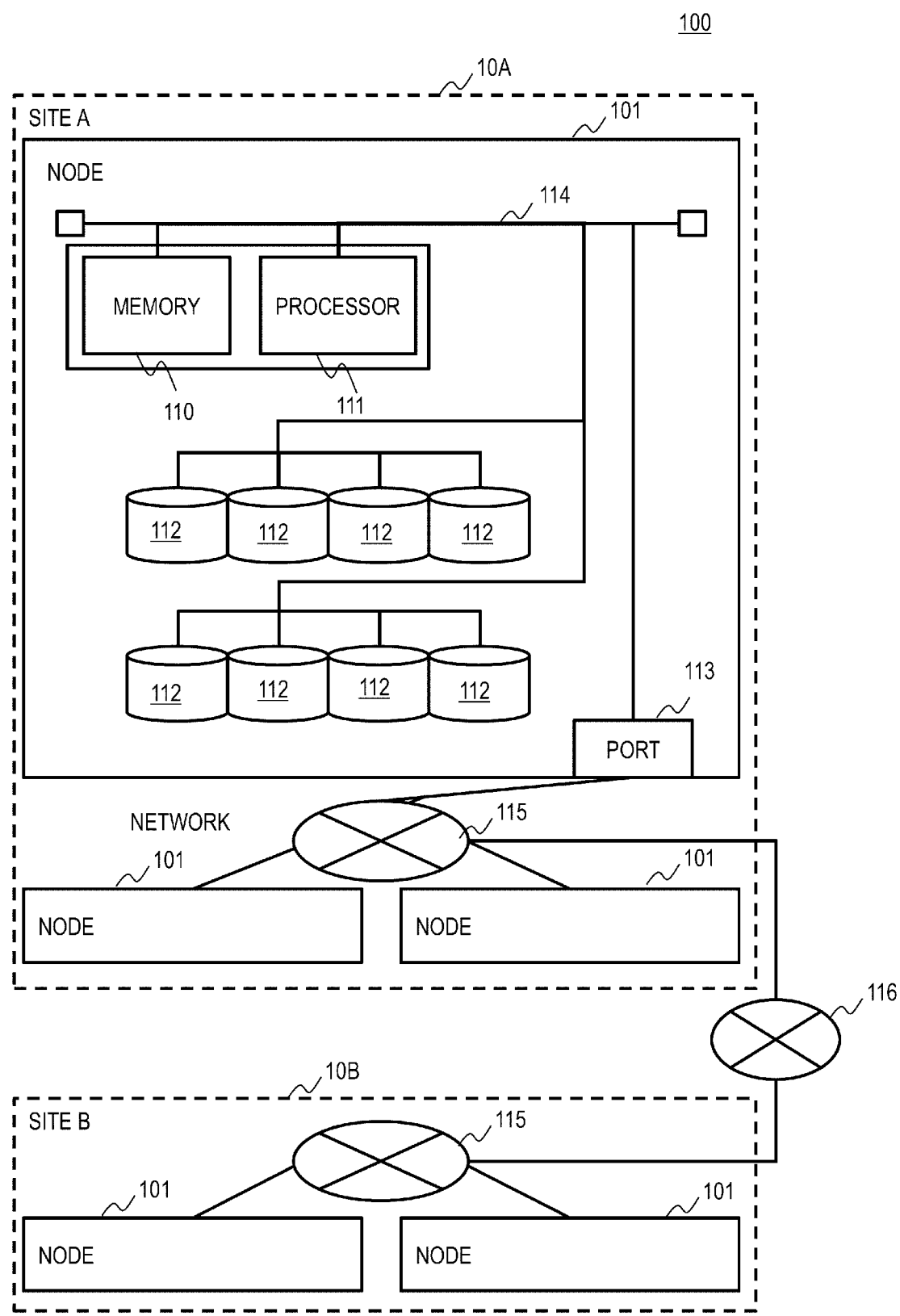
FIG. 3 is a diagram illustrating an overall configuration of a computer system according to the embodiment.

FIG. 3 is a diagram illustrating an overall configuration of the computer system according to the embodiment.

The computer system 100 includes the plurality of nodes 101. The plurality of nodes may be arranged in one or more sites. In the example of FIG. 3, in the computer system 100, the nodes 101 are arranged in a plurality of sites 10A and 10B. Specifically, in a site A (10A), a plurality of nodes 101 are connected via a network 115. In a site B (10B), a plurality of nodes 101 are connected via a network 115. The network 115 of the site A and the network 115 of the site B are connected via a network 116. Here, the networks 115 and 116 are wired Local Area Networks (LAN), wireless LANs, Wide Area Networks (WAN), or the like.

The node 101 includes a memory 110, a processor 111, a plurality of drives (an example of a storage device) 112, a port 113, and a bus 114. The memory 110, the processor 111, the drive 112, and the port 113 are connected via the bus 114.

The memory 110 is, for example, a Random Access Memory (RAM), and stores programs to be executed by the processor 111 and necessary information.

The port 113 is, for example, an interface such as a wired LAN card or a wireless LAN card, and communicates with another device (node 101) via the network 115.

The processor 111 performs various kinds of processing in accordance with the programs stored in the memory 110 and/or the drive 112.

The drive 112 is, for example, a Hard Disk Drive (HDD), a Solid State Drive (SSD), or a non-volatile memory, and stores programs to be executed by the processor 111 and data to be used by the processor 111. A storage area of the drive 112 is used as, for example, a buffer or a cache.

Figure 4:
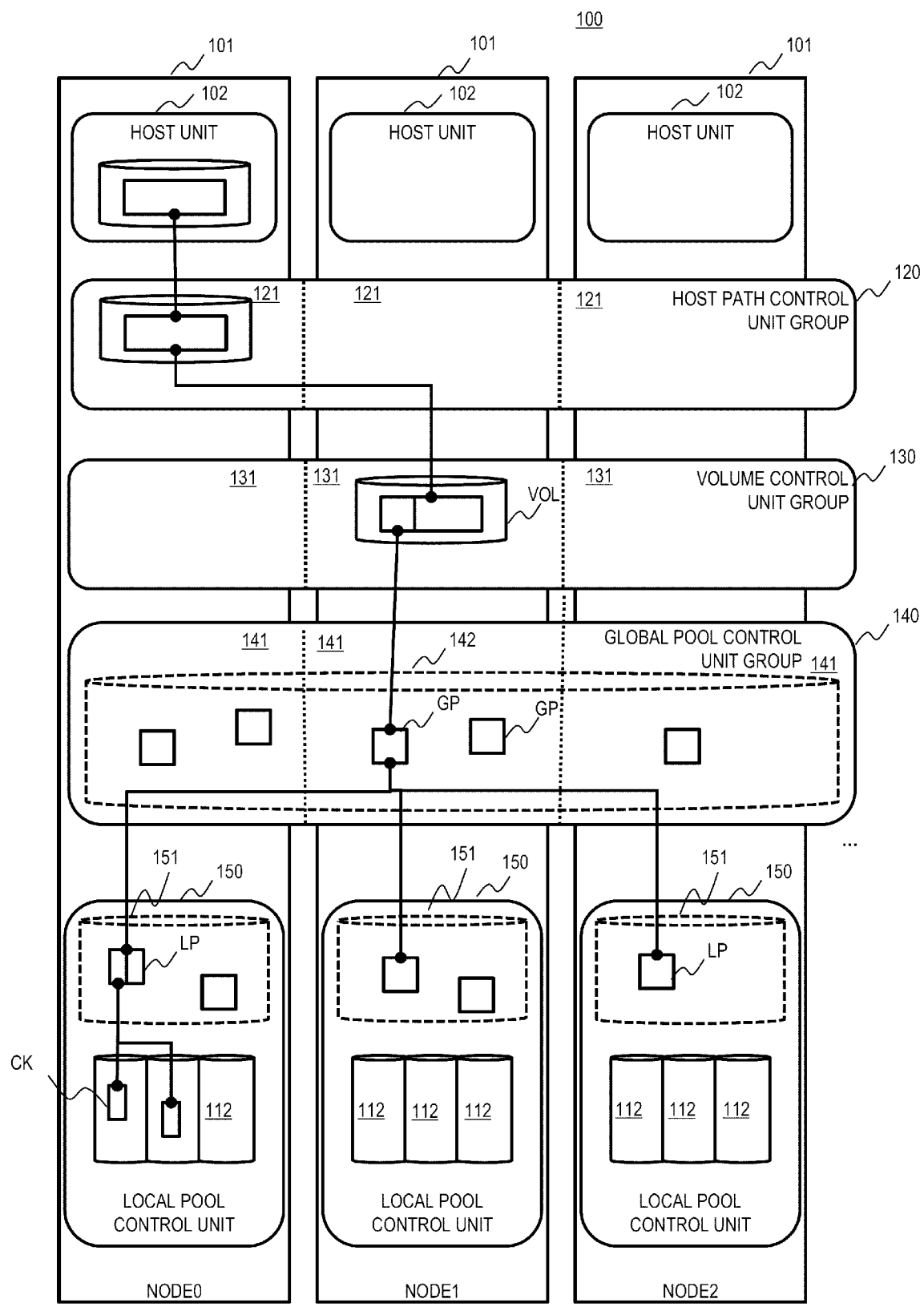
FIG. 4 is a diagram illustrating an overview of an I/O processing and a logical configuration of data according to the embodiment.

FIG. 4 is a diagram illustrating an overview of the I/O processing and a logical configuration of data according to the embodiment.

The computer system 100 includes host units 102, a host path control unit group 120, a volume control unit group 130, a global pool control unit group 140, and a local pool control unit 150.

Figure 5:
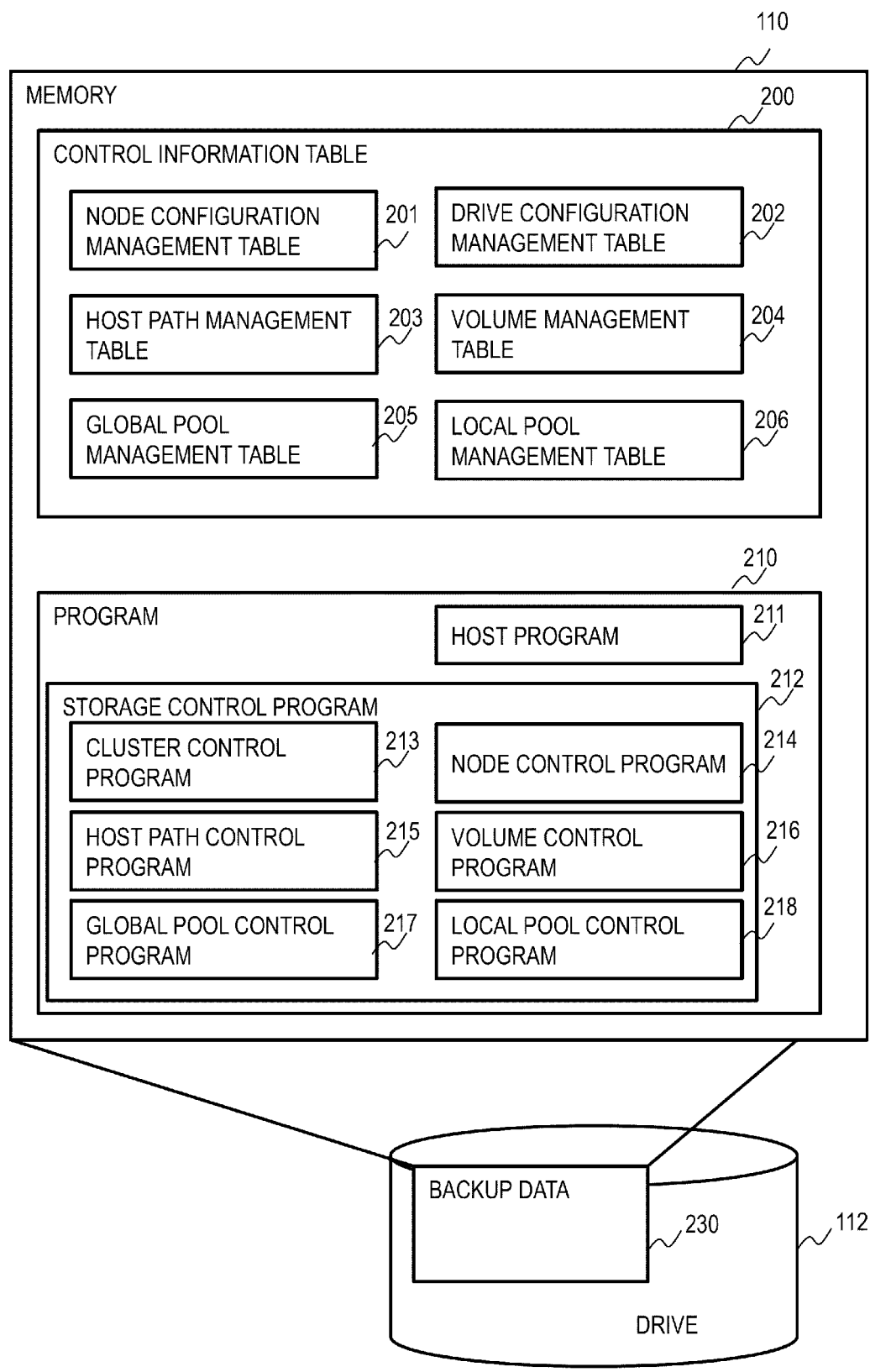
FIG. 5 is a configuration diagram of a memory and a drive according to the embodiment.

The host unit 102 is implemented by the processor 111 executing a host program 211 (see FIG. 5). The host program 211 is a program for processing data, such as a database program, a Web server program, or a data analysis program.

The host unit 102 mounts a virtualized data area (data management unit, for example, a volume VOL) provided by a storage control program 212 (see FIG. 5) and issues an I/O request (read request, write request) to the volume VOL, so as to execute I/O (read, write) of data with respect to the drive 112 of any of the nodes 101.

Here, the I/O request issued by the host unit 102 contains a command, and write target data as necessary. The I/O request command contains, for example, an I/O type (read or write), information (Logical Unit Number (LUN), volume ID) specifying an I/O target area, an address (for example, Logical Block Address (LBA)) of the I/O target area, a size of the I/O target data, a memory address of a storage destination of the I/O target data or a memory address of a storage source of the I/O target data, and information about the host unit 102 in the node 101.

A plurality of host units 102 may be formed in one node 101. The host unit 102 can be moved to another node 101 to distribute the load of the node 101.

The host path control unit group 120 is a cluster of host path control units 121 in which the processor 111 of each node 101 executes a host path control program. 215 (see FIG. 5). The host path control unit 121 of one node 101 cooperates with the host path control unit 121 of another node 101 to execute various kinds of processing. The host path control unit 121 performs control to virtualize transfer of command and data transfer between the host unit 102 and the volume VOL. The host path control unit 121 manages a host path management table 203 (see FIG. 5).

The host path control unit group 120 performs control to transfer a command from the host unit 102 to an owner node 101 (volume control unit 131) of a volume targeted by the command. A communication protocol between the host unit 102 and the host path control unit 121 may be a protocol for block access (for example, SCSI, iSCSI, NVMe, and NVMe-OF), a protocol for file access, a protocol for object access, or other protocols.

For example, when the owner node 101 of the volume VOL targeted by the command is the node of the host path control unit 121, the host path control unit 121 copies the command to the memory, or notifies the volume control unit 131 of a physical address or a virtual address of a storage destination of the command. On the other hand, when the owner node 101 of the volume VOL targeted by the command is not the node of the host path control unit 121, the host path control unit 121 transmits the command through data copying via the network between the nodes.

The volume control unit group 130 is a cluster of the volume control units 131 in which the processor 111 of each node 101 executes a volume control program 216 (see FIG. 5). The volume control unit group 130 provides a storage function of performing thin provisioning for the G pool page GP unit with respect to the volume VOL, or the like. The volume control unit 131 manages a node that is in charge of a volume VOL to be provided to the host unit 102, that is, a node that serves as an owner. The volume control unit 131 manages the volume in accordance with a volume management table 204 (see FIG. 5). The volume control unit 131 specifies an access target G pool page GP in a target volume in accordance with the command transferred from the host path control unit 121, and transfers the command to a global pool control unit 141 that is an owner of the specified G pool page.

In the present embodiment, in order to eliminate the shortage of capacity in the node 101, for example, a G pool allocated to a volume can be another G pool. In this case, the global pool control unit 141 in charge of the G pool page allocated to the volume is changed. In this case, the node 101 including the global pool control unit 141 in charge may also be changed.

The global pool control unit group 140 is a cluster of the global pool control units 141 (an example of a global control unit) in which the processor 111 of each node 101 executes a global pool control program 217 (see FIG. 5). The global pool control unit group 140 manages and controls one or more global pools 142 that are virtual pools configured with storage areas of the drives 112 of a plurality of nodes 101. In the present embodiment, a global pool control unit 141 serving as an owner is set with the G pool page GP of the global pool 142 as a unit. The G pool page GP is a logical area protected by inter-node data protection with a plurality of L pool pages LP provided by the local pool control unit 150. A data size of the G pool page GP may be a fixed length or a variable length. The G pool page GP may not be protected by the inter-node data protection. Specifically, the G pool page GP and the L pool page LP may be associated with each other on a one-to-one basis, and as in a RAID 0, the G pool page GP may be subjected to stripping with a plurality of L pool pages. In this case, the host program 211 may perform the inter-node data protection.

As the inter-node data protection, mirroring (Mirroring) with replication, or Erasure Coding (including a RAID 5 and a RAID 6) that performs redundancy using parity can be adopted among the local pools of two or more nodes.

In the present embodiment, the global pool control unit 141, in charge of the G pool page allocated to a target volume of the I/O processing of the host unit 102, controls transmission (for example, a transmission source or a transmission destination) of the target data of the I/O processing performed by the host unit 102, based on a commonality relationship among a node (first node) of the host unit 102 and the host path control unit 121 that execute the I/O processing, a node (second node) of the global pool control unit 141, and a node (third node) of the local pool control unit 150 in charge of an L pool of the L pool page allocated to a target G pool page of the I/O processing, that is, based on a relationship whether the first node, the second node and the third node are the same node or different nodes. Accordingly, a route having a high processing efficiency can be appropriately selected according to the state, and the efficiency of the I/O processing can be improved.

In the present embodiment, in order to eliminate the shortage of the capacity of the drive 112 in the node 101, for example, the L pool that provides the L pool page allocated to the G pool page can be another L pool. In this case, the local pool control unit 150 in charge of the L pool page allocated to the G pool page is changed. In this case, the node 101 including the local pool control unit 150 in charge is changed.

The local pool control unit 150 (an example of a local control unit) is implemented by the processor 111 of the node 101 executing a local pool control program 218 (see FIG. 5). The local pool control unit 150 manages and controls a local pool 151 that is a virtual pool configured with a storage area of a plurality of drives 112 in the own node 101. The local pool control unit 150 provides the L pool page (LP) of the local pool 151 to the global pool control unit 141. The L pool page LP is configured with one or more data areas (chunks CK) in the drive 112. A data size of the chunk CK may be a fixed length or a variable length. The L pool page is protected by intra-node data protection with a plurality of chunks. As the intra-node data protection, for example, a RAID 0, a RAID 1, a RAID 5, and a RAID 6 are adopted. The L pool page LP may not be protected by the intra-node data protection. Specifically, the L pool page and the chunk may be associated with each other on a one-to-one basis, and as in the RAID 0, the L pool page LP may be subjected to stripping with a plurality of chunks.

In FIG. 4, an example is shown in which each node 101 is provided with the host unit 102, the host path control unit 121, the volume control unit 131, the global pool control unit 141, and the local pool control unit 150. Alternatively, according to the role of each node 101 of the computer system 100 and the like, only a part of the nodes 101 may be provided with those constituent components, or only a part of the constituent elements may be provided in the node 101.

FIG. 5 is a configuration diagram of a memory and a drive according to the embodiment.

The memory 110 stores a control information table 200 and a program 210. The control information table 200 includes a node configuration management table 201, a drive configuration management table 202, the host path management table 203, the volume management table 204, a global pool management table 205, and a local pool management table 206. It should be noted that all tables of the control information table 200 may not be stored in each node 101, and each node 101 may store a part of the tables necessary therefor.

The program 210 includes the host program 211 and the storage control program 212. The storage control program 212 includes a cluster control program 213, a node control program 214, the host path control program 215, the volume control program 216, the global pool control program 217, and the local pool control program 218. It should be noted that all programs of the program 210 may not be stored in each node 101, and each node 101 may store a program necessary therefor.

The cluster control program 213 is executed by the processor 111 to execute a processing of controlling a cluster configured with a plurality of nodes 101. The node control program 214 is executed by the processor 111 to execute a processing of controlling the node 101.

The drive 112 stores backup data 230 of the control information table 200 and of the program 210 that are stored in the memory 110. The backup data 230 in the drive 112 may be, for example, redundantly managed in the node 101, or may be redundantly managed among a plurality of nodes 101.

Next, the node configuration management table 201 will be described in detail.

FIG. 6 is a configuration diagram of the node configuration management table according to the embodiment.

Each system is provided with one node configuration management table 201. The node configuration management table 201 stores an entry corresponding to each node constituting a cluster. The entry of the node configuration management table 201 includes fields of a node ID, a node address list, a running application program ID list, and a belonging global pool ID. In the field of the node ID, identification information (node ID) of a node 101 corresponding to the entry is stored. In the field of the node address list, a list of addresses (for example, IP addresses) of nodes 101 corresponding to the entries is stored. In the field of the running application program ID list, a list of IDs of applications running in the nodes 101 corresponding to the entries is stored. In the field of the belonging global pool ID, an ID (global pool ID) of the global pool that belongs to the node 101 corresponding to the entry, that is, an ID of the global pool provided by a storage capacity of the drive 112 of the node 101, is stored.

Next, the drive configuration management table 202 will be described in detail.

FIG. 7 is a configuration diagram of the drive configuration management table according to the embodiment.

Each node is provided with one drive configuration management information table 202, and each table is associated with the node ID of the node 101 corresponding to the table. The drive configuration management information table 202 stores an entry for each drive 112 of the node 101 corresponding to the table. The entry of the drive configuration management information table 202 includes fields of a drive ID, a physical capacity, and a belonging local pool ID. In the field of the drive ID, an ID (drive ID) of a drive 112 corresponding to an entry is stored. In the field of the physical capacity, a physical capacity of the drive 112 corresponding to the entry is stored. In the field of the belonging local pool ID, an ID (local pool ID) of the local pool to which the drive 112 corresponding to the entry belongs is stored.

Next, the host path management table 203 will be described in detail.

FIG. 8 is a configuration diagram of the host path management table according to the embodiment.

Each global pool is provided with one host path management information table 203, and each table is associated with the global pool ID of the global pool 142 corresponding to the table. The host path management information table 203 stores an entry for each volume. The entry of the host path management information table 203 includes fields of a volume ID, a volume owner node ID, and a host application node ID list. In the field of the volume ID, an ID (volume ID) of a volume, to which a global pool page corresponding to an entry is allocated, is stored. In the field of the volume owner node ID, a node ID of a node (volume owner) in charge of the volume is stored. In the field of the host application node ID list, a node ID of a node, in which a host program using the volume corresponding to the entry is running, is stored.

Next, the volume management table 204 will be described in detail.

FIG. 9 is a configuration diagram of the volume management table according to the embodiment.

Each volume is provided with one volume management table 204, and each table is associated with a volume ID of a volume corresponding to the table. The volume management table 204 stores an entry for each logical block in the volume. The entry of the volume management table 204 includes fields of a logical block ID, a block size, a global pool ID, and a global pool page ID.

In the field of the logical block ID, an ID (logical block ID) of a logical block corresponding to an entry is stored. In the field of the block size, a data size (block size) of the logical block corresponding to the entry is stored. In the field of the global pool ID, an ID of a G pool whose page is allocated to the logical block corresponding to the entry is stored. In the field of the global pool page ID, an ID (G pool page ID) of a G pool page allocated to the logical block corresponding to the entry is stored.

Next, the global pool management table 205 will be described in detail.

FIG. 10 is a configuration diagram of the global pool management table according to the embodiment.

Each global pool is provide with one global pool management table 205, and each table is associated with a global pool ID of the global pool 142 corresponding to the table. The global pool management table 205 stores an entry for each G pool page. The entry of the global pool management table 205 includes fields of the global pool page ID, a page size, an owner node ID, a data protection setting, and a list of a node ID, a local pool ID, and a local pool page ID.

In the field of the global pool page ID, an ID of a G pool page corresponding to an entry is stored. In the field of the page size, a page size of the G pool page corresponding to the entry is stored. In the field of the owner node ID, a node ID of a node serving as an owner of the G pool page corresponding to the entry is stored. In the field of the data protection setting, a setting (data protection setting) for redundantly protecting data of the G pool page corresponding to the entry by using a plurality of nodes is stored. Here, examples of the data protection setting include Mirroring that multiplexes and stores data, Erasure Coding that performs redundancy using parity, and the like. In the field of list of the node ID, the local pool ID, and the local pool page ID, information for specifying a plurality of L pool pages allocated to the G pool page corresponding to the entry is stored. The information for specifying the L pool page includes a node ID of the node 101 in which an L pool is stored, an ID of the L pool, and an ID of the L pool page.

Next, the local pool management table 206 will be described in detail.

FIG. 11 is a configuration diagram of the local pool management table according to the embodiment.

Each local pool is provided with one local pool management table 206, and each table is associated with the node 101 having the local pool 151 corresponding to the table, that is, the node ID of the owner node 101 of the local pool 151, and with the local pool ID of the local pool 151. The local pool management table 206 stores an entry for each L pool page. The entry of the local pool management table 206 includes fields of a local pool page ID, a page size, a data protection setting, and a list of a drive ID, a start address, and a size.

In the field of the L pool page ID, an ID of an L pool page corresponding to an entry is stored. In the field of the page size, a page size of the L pool page corresponding to the entry is stored. In the field of the data protection setting, a setting (data protection setting) for redundantly protecting data of the L pool page corresponding to the entry is stored. Here, examples of the data protection setting include RAID with different levels (for example, a RAID 0, a RAID 1, a RAID 5, and a RAID 6). In the field of the list of the drive ID, the start address, and the size, information indicating an area of the drive 112, in which the data of the L pool page corresponding to the entry is stored, is stored. Examples of the information indicating the area of the drive 112 include a drive ID of a drive in which the L pool page is stored, a start address indicating a head of the area in the drive 112, and the size of the L pool page.

Next, a processing operation of the computer system 100 will be described.

First, the I/O processing performed by the host unit 102 will be described.

Figure 12:
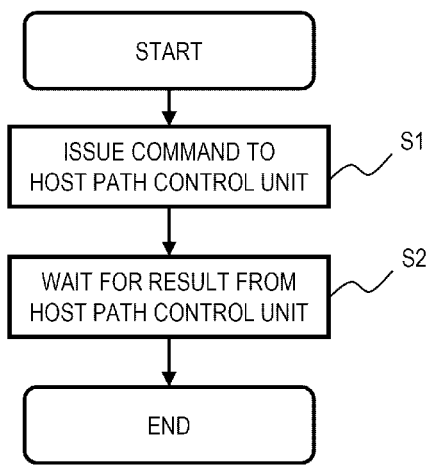
FIG. 12 is a flowchart illustrating an I/O processing of a host unit according to the embodiment.

FIG. 12 is a flowchart illustrating the I/O processing of the host unit according to the embodiment.

The host unit 102 issues an I/O command to the host path control unit 121 in the own node 101 (step S1), waits for a result (response) corresponding to the command from the host path control unit 121 (step S2), and ends the I/O processing when the response to the command is received.

Next, the I/O processing performed by the host path control unit 121 will be described.

Figure 13:
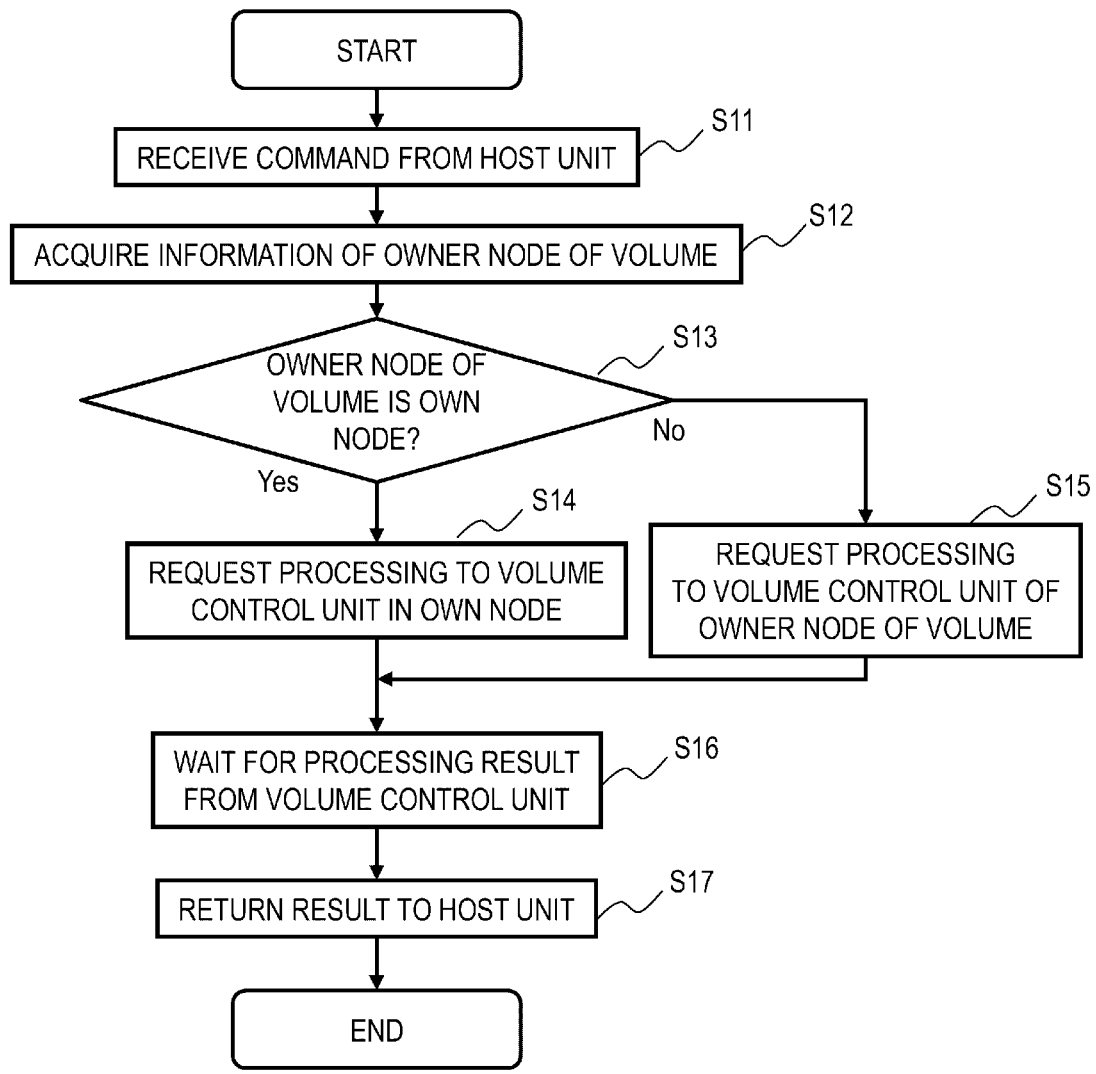
FIG. 13 is a flowchart illustrating a processing of a host path control unit according to the embodiment.

FIG. 13 is a flowchart illustrating a processing of the host path control unit according to the embodiment. This processing is performed by the host path control unit 121 that has received the command transmitted from the host unit 102 in step S1.

When receiving the command from the host unit 102 (step S11), the host path control unit 121 refers to the host path management table 203, and acquires information (for example, node ID) of an owner node of an I/O target volume (referred to as a target volume), which is contained in the command (step S12). The owner node ID can be acquired by referring to the host path management table 203 using both a volume ID of the target volume and a node ID of the host unit 102 that has transmitted the command.

Next, the host path control unit 121 determines whether the owner node 101 of the target volume is the own node (step S13).

As a result, when the owner node of the target volume is the own node (S13: Yes), the host path control unit 121 transmits an I/O processing request to the volume control unit 131 in the own node 101, and advances the processing to step S16. On the other hand, when the owner node of the target volume is not the own node (S13: No), the host path control unit 121 transmits an I/O processing request via the inter-node communication to the volume control unit 131 in the owner node 101 of the target volume, and advances the processing to step S16. Here, the processing request contains what is necessary among contents of the command transmitted by the host unit 102.

In step S16, the host path control unit 121 waits for a processing result (response) corresponding to the processing request from the volume control unit 131 that has performed the processing. Here, when a read processing is performed, the processing result contains read target data.

Next, when receiving the processing result, the host path control unit 121 returns the result to the host unit 102 in the own node 101 that has transmitted the command (step S17), and ends the processing.

Next, the processing performed by the volume control unit 131 will be described.

Figure 14:
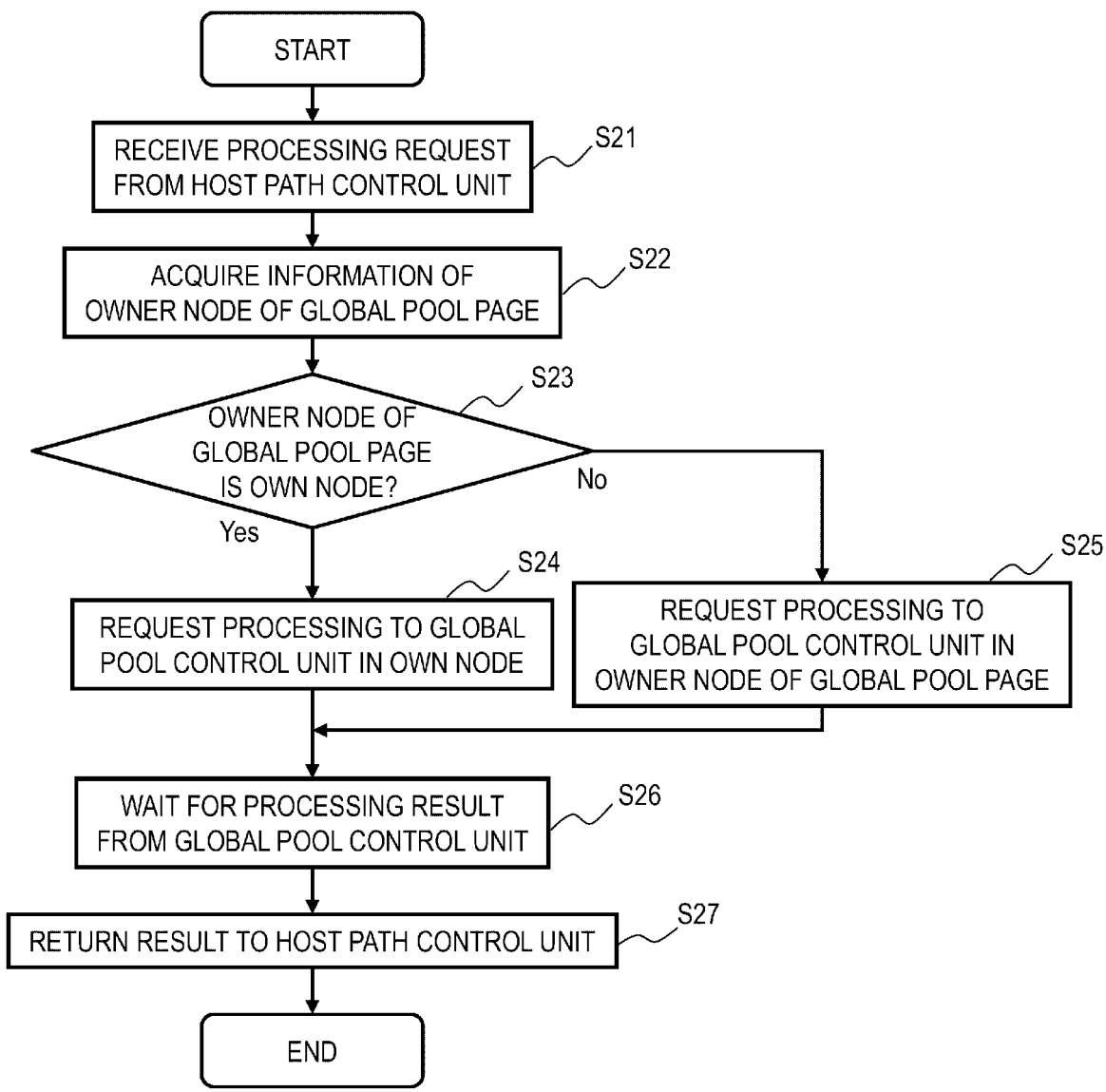
FIG. 14 is a flowchart illustrating a processing of a volume control unit according to the embodiment.

FIG. 14 is a flowchart illustrating the processing of the volume control unit according to the embodiment. This processing is executed by the volume control unit 131 that has received the processing request transmitted from the host path control unit 121 in step S14 or step S15 in FIG. 13.

When receiving the processing request from the host path control unit 121 (step S21), the volume control unit 131 refers to the volume management table 204, and acquires information about a node 101 serving as an owner of a G pool page allocated to an I/O target logical block (target logical block) of the target volume (step S22). Here, when there are a plurality of I/O target logical blocks, information about the node 101 serving as the owner of the G pool page is acquired for each target logical block.

Next, the volume control unit 131 executes the following steps S23 to S25 for each target logical block. That is, the volume control unit 131 determines whether the owner node 101 of the G pool page allocated to the target logical block is the own node 101 (the node 101 to which the volume control unit 131 belongs) (step S23).

As a result, when the node 101 serving as the owner of the G pool page allocated to the target logical block of the target volume is the own node 101 (step S23) (step S23: Yes), the volume control unit 131 transmits an I/O processing request to a global pool control unit 141 in the own node 101, and advances the processing to step S26. On the other hand, when the node serving as the owner of the target volume is not the own node (step S23: No), the volume control unit 131 transmits a I/O processing request via the inter-node communication to a global pool control unit 141 in an owner node 101 of the G pool page, and advances the processing to step S26. Here, the processing request contains at least a part of the processing contents received in step S21.

In step S26, the volume control unit 131 waits for the processing result corresponding to the processing request transmitted in step S24 or step S25 from the global pool control unit 141. When all processing results from the global control unit 141 are received, the volume control unit 131 returns the results to the host path control unit 121 (step S27), and ends the processing.

Next, the processing performed by the global pool control unit 141 will be described.

Figure 15:
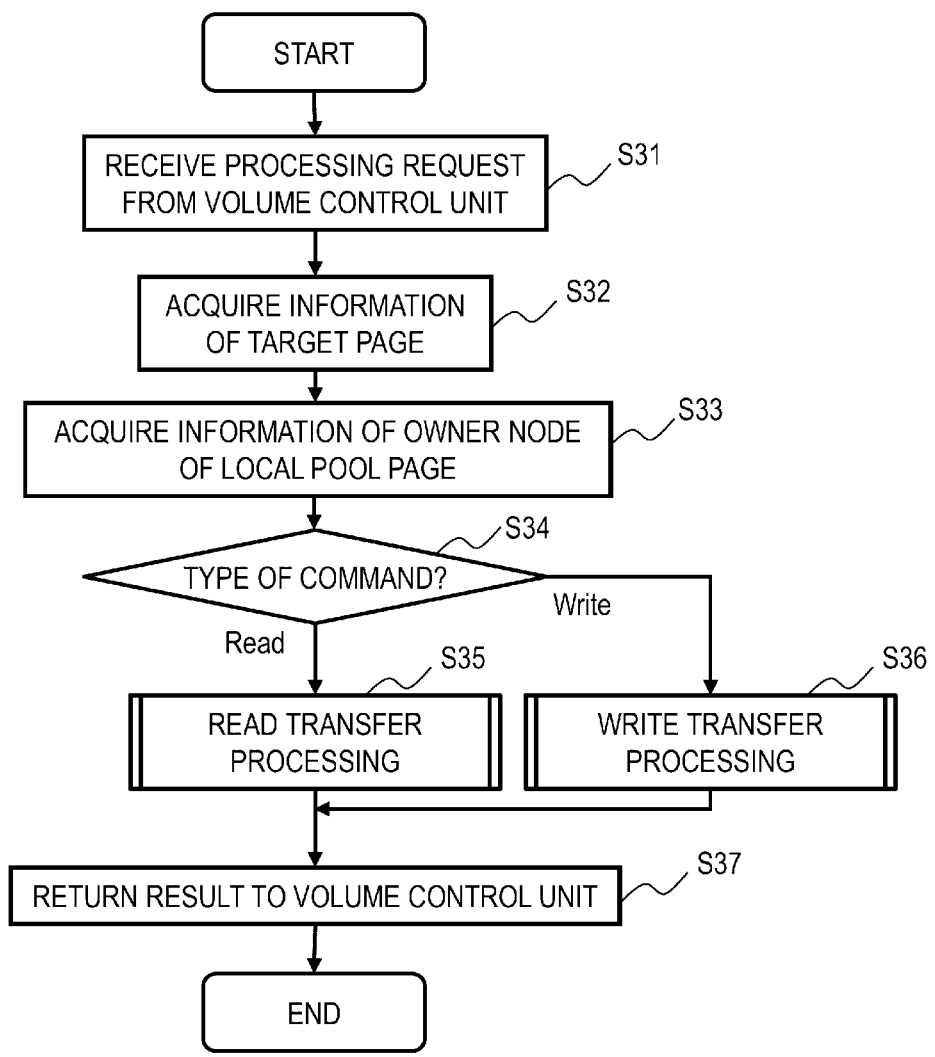
FIG. 15 is a flowchart illustrating a main processing of a global pool control unit according to the embodiment.

FIG. 15 is a flowchart illustrating a main processing of the global pool control unit according to the embodiment. This processing is executed by the global pool control unit 141 that has received the processing request transmitted from the volume control unit 131 in step S24 or step S25 in FIG. 14.

When receiving the processing request from the volume control unit 131 (step S31), the global pool control unit 141 acquires information about the G pool page (target G pool page) corresponding to the processing request (step S32). Examples of the information about the target G pool page include a data protection setting of the target G pool page, a cache state of data of the target G pool page (cache hit or cache miss), statistical information about access to an area of the target G pool page, and the like. For example, the data protection setting of the target G pool page can be acquired from the global pool management table 205, and other information can be acquired from other tables (not shown).

Next, the global pool control unit 141 refers to the local pool management table 206, and acquires information about an owner node 101 of an L pool page allocated to the target G pool page (step S33).

Next, the global pool control unit 141 specifies a type of the command in the processing request (step S34). As a result, when the type of the command is read (step S34: Read), the global pool control unit 141 executes a read transfer processing (see FIG. 16) (step S35). When the type of the command is write (step S34: Write), the global pool control unit 141 executes a write transfer processing (see FIG. 18) (step S36).

Next, the global pool control unit 141 returns the processing result to the volume control unit 131 (step S37), and ends the processing.

Next, the read transfer processing (step S35 in FIG. 15) will be described.

Figure 16:
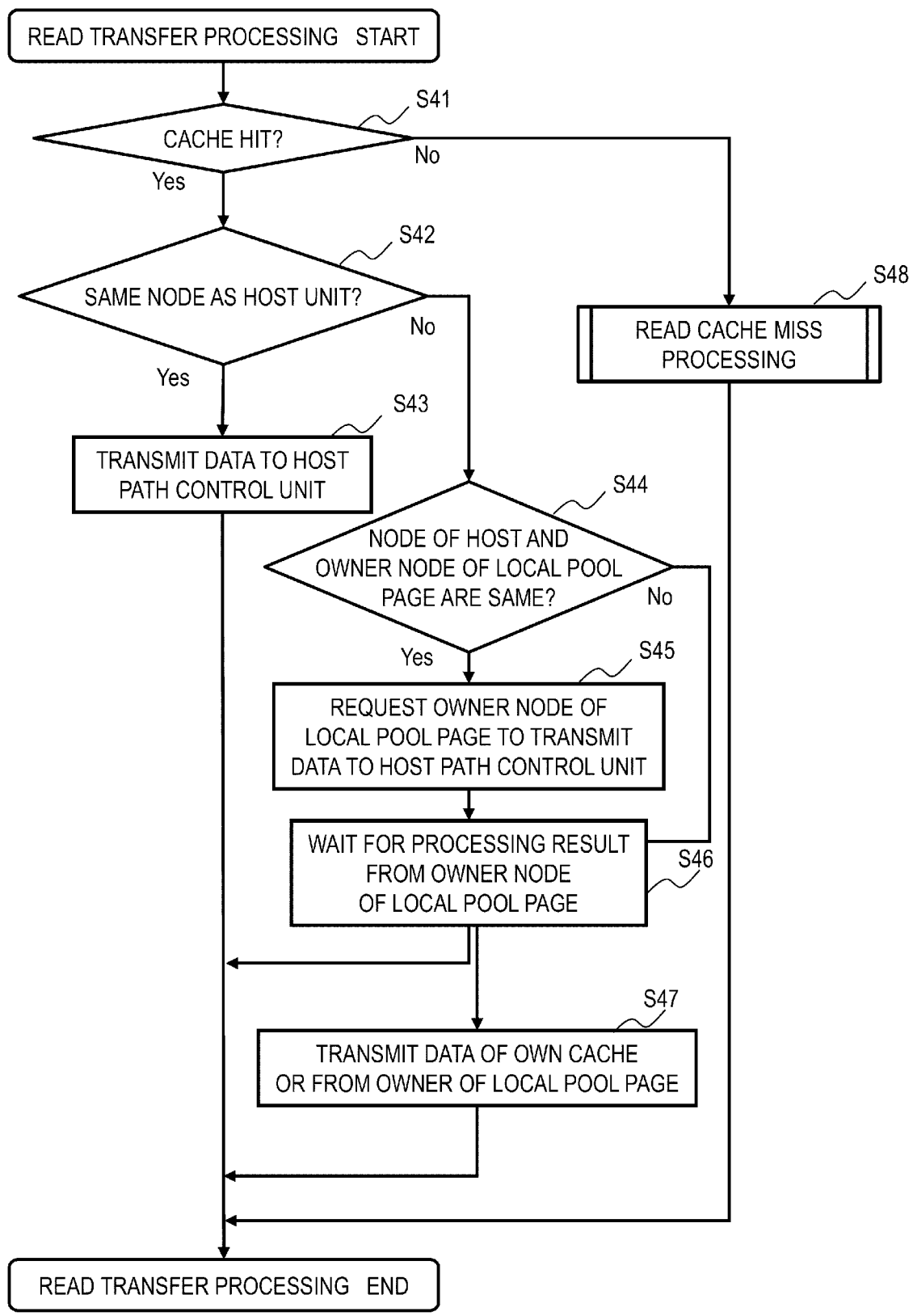
FIG. 16 is a flowchart illustrating a read transfer processing according to the embodiment.

FIG. 16 is a flowchart illustrating the read transfer processing according to the embodiment.

The global pool control unit 141 determines whether the data of the target G pool page, as a read target of the command in the processing request, is subjected to a cache hit, that is, whether the data of the target G pool page in the own node 101 is cached (step S41).

As a result, when the data of the target G pool page is subjected to a cache hit (step S41: Yes), the global pool control unit 141 determines whether the own node 101 is the same as the node 101 of the host unit 102 (issue source host unit) that is an issue source of the original command corresponding to the processing request (step S42). The information about the node 101 of the host unit 102 that is an issue source of the original command is contained in the processing request.

As a result, when the own node 101 of the global pool control unit 141 is the same as the node 101 of the issue source host unit 102 (step S42: Yes), the global pool control unit 141 transmits the cached data to the host path control unit 120 that is a processing request source (step S43), and ends the read transfer processing.

On the other hand, when the own node 101 of the global pool control unit 141 is not the same as the node 101 of the issue source host unit 102 (step S42: No), the global pool control unit 141 determines whether the node 101 of the issue source host unit 102 and the owner node 101 of the L pool page corresponding to the target G pool page are the same node 101 (step S44).

As a result, when the node 101 of the issue source host unit 102 and the owner node 101 of the L pool page corresponding to the target G pool page are the same node 101 (step S44: Yes), the global pool control unit 141 requests the local pool control unit 150 in the owner node 101 of the L pool page to transmit data to the host path control unit 121 that is the processing request source (step S45). The local pool control unit 150 that has received this request transmits the target data to the host path control unit 121 that is the processing request source, via communication (intra-node communication) in the same node 101 without using the global pool control unit 141. Accordingly, it is not necessary to transmit the target data to the global pool control unit 141 of another node 101, and the number of times of data transmission between the nodes 101 can be reduced.

Next, the global pool control unit 141 waits for a processing result from the local pool control unit 150 in the owner node 101 of the L pool page (step S46), and ends the processing after receiving the processing result.

On the other hand, when the node 101 of the issue source host unit 102 and the owner node 101 of the L pool page corresponding to the target G pool page are not the same node 101 (step S44: No), the global pool control unit 141 transmits the cached data to the host path control unit 121 that is the processing request source, or the global pool control unit 141 requests the local pool control unit 150 in the owner node 101 of the L pool page to transmit data to the host path control unit 121 that is the processing request source (step S47), and ends the processing. Whether to transmit the cached data to the host path control unit 121 that is the processing request source, or to request the local pool control unit 150 to transmit data to the host path control unit 121 that is the processing request source, may be determined by selecting one that takes shorter communication time.

On the other hand, when the data of the target G pool page is not subjected to a cache hit (step S41: No), the global pool control unit 141 executes a read cache miss processing (see FIG. 17) (step S48), and ends the processing.

Next, the read cache miss processing (step S48 in FIG. 16) will be described.

Figure 17:
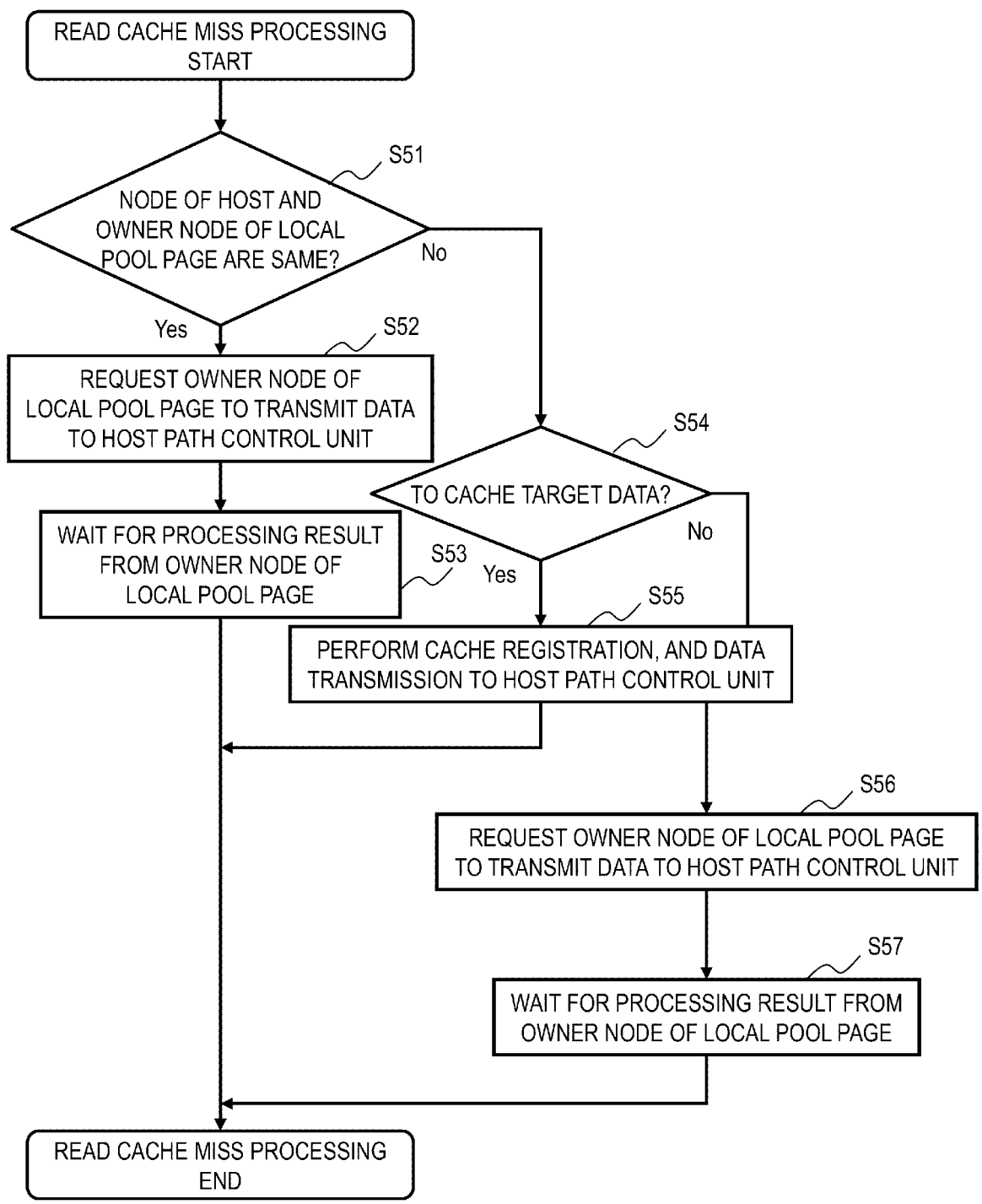
FIG. 17 is a flowchart illustrating a read cache miss processing according to the embodiment.

FIG. 17 is a flowchart illustrating the read cache miss processing according to the embodiment.

The global pool control unit 141 determines whether the node 101 of the issue source host unit 102 and the owner node 101 of the L pool page corresponding to the target G pool page are the same node 101 (step S51).

As a result, when the node 101 of the issue source host unit 102 and the owner node 101 of the L pool page corresponding to the target G pool page are the same node 101 (step S51: Yes), the global pool control unit 141 requests the local pool control unit 150 in the owner node 101 of the L pool page to transmit data to the host path control unit 121 that is the processing request source (step S52). The local pool control unit 150 that has received this request transmits the target data to the host path control unit 121 that is the processing request source, via communication (intra-node communication) in the same node 101 without using the global pool control unit 141. Accordingly, it is not necessary to transmit the read data to the global pool control unit 141 of another node 101, and the number of times of data transmission between the nodes 101 can be reduced.

Next, the global pool control unit 141 waits for a processing result from the local pool control unit 150 in the owner node 101 of the L pool page (step S53), and ends the processing after receiving the processing result.

On the other hand, when the node 101 of the issue source host unit 102 and the owner node 101 of the L pool page corresponding to the target G pool page are not the same node 101 (step S51: No), the global pool control unit 141 determines whether to cache the target data (step S54). Whether to cache the target data may be determined based on, for example, statistical information (for example, access pattern and resource using amount) about access to a target area.

As a result, when it is determined that the target data is to be cached (step S54: Yes), the global pool control unit 141 performs cache registration of the target data and transmission of the target data to the host path control unit 121 (step S55), and ends the processing.

Specifically, for example, when the global pool control unit 141 and the local pool control unit 150 in the owner node of a target data area share the same node 101, the global pool control unit 141 requests the target area from the local pool control unit 150, acquires the target data from the local pool control unit 150 via intra-node communication, and stores the target data as cache data in the memory. In addition, the global pool control unit 141 transmits the cached data to the host path control unit 121, or causes the local pool control unit 150 to transmit the target data to the host path control unit 121. The cache registration and the data transmission to the host path control unit 121 may be performed in parallel if possible. On the other hand, when the global pool control unit 141 and the local pool control unit 150 in the owner node of the target data area do not share the same node 101, the global pool control unit 141 requests the target data from the local pool control unit 150, acquires the target data from the local pool control unit 150 via inter-node communication, and stores the target data as cache data in the memory. In addition, the global pool control unit 141 transmits the cached data to the host path control unit 121, or causes the local pool control unit 150 to transmit the target data to the host path control unit 121.

On the other hand, when it is determined that the target data is not to be cached (step S54: No), the global pool control unit 141 requests the local pool control unit 150 to transmit the target data to the host path control unit 121 (step S56). Here, the transmission request contains information about the node 101 of the host path control unit 121. When receiving the request, the local pool control unit 150 extracts the target data from the drive 112 and transmits the target data to the host path control unit 121. Accordingly, it is not necessary to transmit the target data to the global pool control unit 141, and the number of times of data transmission can be reduced.

Next, the global pool control unit 141 waits for a processing result from the local pool control unit 150 in the owner node 101 of the L pool page (step S57), and ends the processing after receiving the processing result.

Next, the write transfer processing (step S36 in FIG. 15) will be described.

Figure 18:
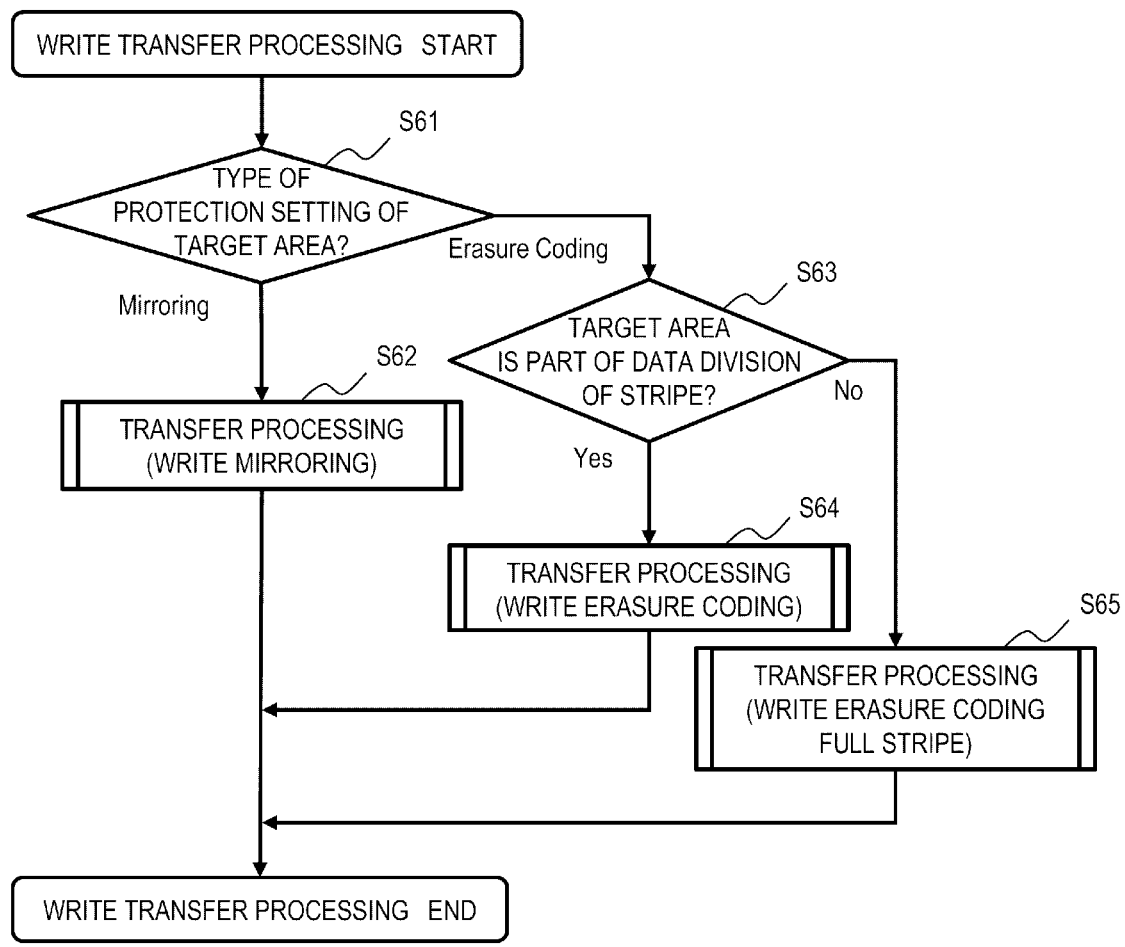
FIG. 18 is a flowchart illustrating a write transfer processing according to the embodiment.

FIG. 18 is a flowchart illustrating the write transfer processing according to the embodiment.

The global pool control unit 141 refers to the global pool management table 205, and specifies a type of protection setting for a write target global page (target area) of the command (step S61).

As a result, when the protection setting for the target area is Mirroring (step S61: Mirroring), the global pool control unit 141 executes a transfer processing (Write Mirroring) (see FIG. 19) (step S62), and ends the present processing. When the protection setting for the target area can be setting without protection (that is, setting without inter-node data protection), the processing may be performed in the same flow as that in the case where the protection setting is "Mirroring". The difference between the processing in the setting without inter-node data protection and the processing in the case of Mirroring will be described later.

On the other hand, when the protection setting for the target area is Erasure Coding (step S61: Erasure Coding), the global pool control unit 141 determines whether the target area is a part of a data division of a stripe (step S63).

As a result, when the target area is a part of a data division of a stripe (step S63: Yes), the global pool control unit 141 executes a transfer processing (Write Erasure Coding) (see FIG. 21) (step S64), and ends the present processing.

On the other hand, when the target area is not a part of a data division of a stripe, that is, the target area is the whole data division of the stripe (full stripe) (step S63: No), the global pool control unit 141 executes a transfer processing (Write Erasure Coding full stripe) (see FIG. 24) (Step S65), and ends the present processing.

Next, the transfer processing (Write Mirroring) (step S62 in FIG. 18) will be described.

Figure 19:
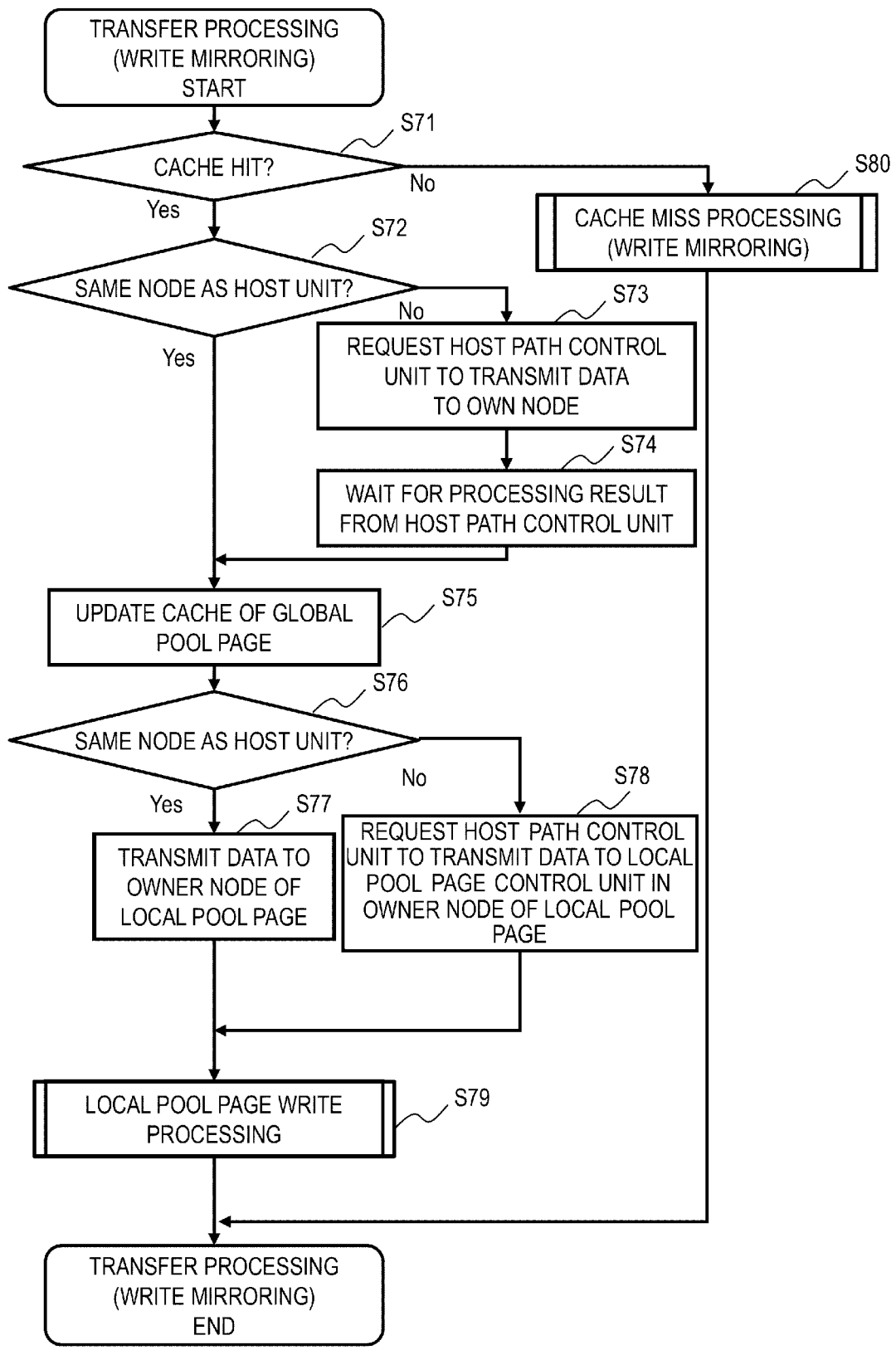
FIG. 19 is a flowchart illustrating a transfer processing (Write Mirroring) according to the embodiment.

FIG. 19 is a flowchart illustrating the transfer processing (Write Mirroring) according to the embodiment.

The global pool control unit 141 determines whether the data of the target G pool page, as a write target of the command in the processing request, is subjected to a cache hit, that is, whether the data of the target G pool page in the own node 101 is cached (step S71).

As a result, when the data of the target G pool page is subjected to a cache hit (step S71: Yes), the global pool control unit 141 determines whether the own node 101 is the same as the node 101 of the host unit 102 (issue source host unit) that is an issue source of the original command corresponding to the processing request (step S72).

As a result, when the own node 101 of the global pool control unit 141 is the same as the node 101 of the issue source host unit 102 (step S72: Yes), the global pool control unit 141 advances the processing to step S75.

On the other hand, when the own node 101 of the global pool control unit 141 is not the same as the node 101 of the issue source host unit 102 (step S72: No), the global pool control unit 141 requests the host path control unit 121 in the node 101 of the issue source host unit 102 to transmit data to the own node 101 (of the global pool control unit 141) (step S73).

Next, the global pool control unit 141 waits for a processing result from the host path control unit 121 (step S74), and advances the processing to step S75 after receiving the processing result.

In step S75, the global pool control unit 141 updates the cached data of the G pool page using data in the memory or using the target data acquired in step S74.

Next, the global pool control unit 141 determines whether the own node 101 is the same as the node 101 of the issue source host unit (step S76).

As a result, when the own node 101 of the global pool control unit 141 is the same as the node 101 of the issue source host unit 102 (step S76: Yes), the global pool control unit 141 transmits the target data to the local pool control unit 150 in the owner node 101 of the L pool page corresponding to a write target G pool page (step S77), and advances the processing to step S79. Here, when the protection setting is Mirroring, there are a plurality of owner nodes 101 of the L pool page corresponding to the write target G pool page is, and the same data is transmitted to the plurality of nodes 101. Meanwhile, when the protection setting is setting without protection, there are one or more owner nodes 101 of the L pool page corresponding to the write target G pool page, and there are a plurality of owner nodes 101, different data is transmitted to the plurality of nodes 101.

On the other hand, when the own node 101 of the global pool control unit 141 is not the same as the node 101 of the issue source host unit 102 (step S76: No), the global pool control unit 141 requests the host path control unit 121 in the node 101 of the issue source host unit 102 to transmit the target data to the local pool control unit 150 in the owner node 101 of the L pool page corresponding to the target G pool page (step S78), and advances the processing to step S79. Here, when the protection setting is Mirroring, there are a plurality of owner nodes 101 of the L pool page corresponding to the target G pool page, and the same data is transmitted to the plurality of nodes 101. Meanwhile, when the protection setting is setting without protection, there are one or more owner nodes 101 of the L pool page corresponding to the target G pool page, and when there are a plurality of owner nodes 101, different data is transmitted to the plurality of nodes 101.

Next, the global pool control unit 141 executes a local pool page write processing (see FIG. 28) (step S79), and ends the present processing.

On the other hand, when the data of the target G pool page is not subjected to a cache hit (step S71: No), the global pool control unit 141 executes a cache miss processing (Write Mirroring) (see FIG. 20) (step S80), and ends the present processing.

In the transfer processing (Write Mirroring), as shown in steps S72 to S75, the cache is updated using new data when a cache hit occurs. Alternatively, for example, the cache may be invalidated instead of being updated, depending on the statistical information of the target area or a system state.

Next, the cache miss processing (Write Mirroring) (step S80 in FIG. 19) will be described.

Figure 20:
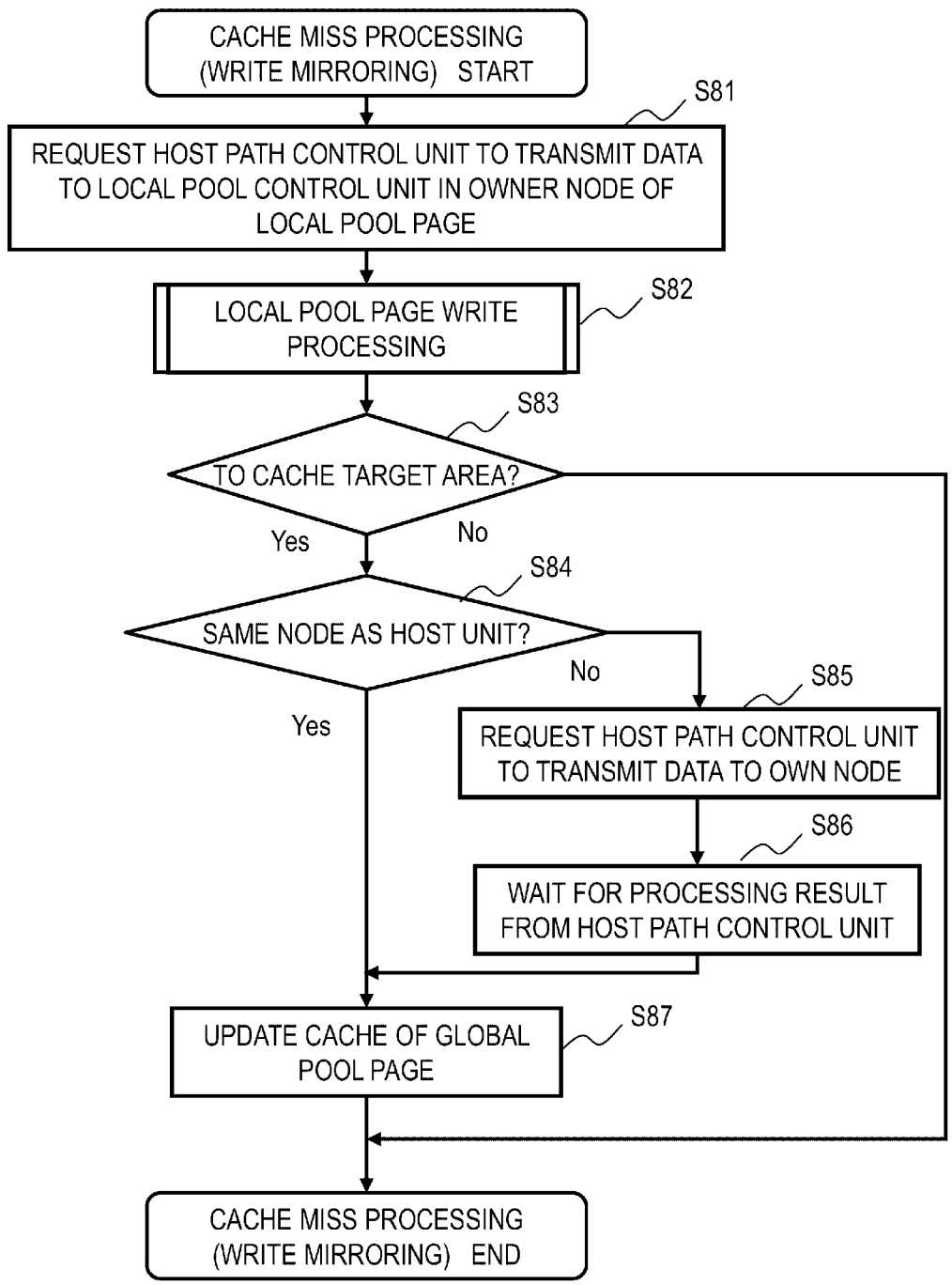
FIG. 20 is a flowchart illustrating a cache miss processing (Write Mirroring) according to the embodiment.

FIG. 20 is a flowchart illustrating the cache miss processing (Write Mirroring) according to the embodiment.

The global pool control unit 141 requests the host path control unit 121 in the node 101 of the issue source host unit 102 to transmit the target data to the local pool control unit 150 in the owner node 101 of the L pool page corresponding to the target G pool page (step S81). The global pool control unit 141 executes the local pool page write processing (see FIG. 28) (step S82). Here, in step S81, when the protection setting is Mirroring, there are a plurality of owner nodes 101 of the L pool page corresponding to the target G pool page, and the same data is transmitted to the plurality of nodes 101. Meanwhile, when the protection setting is setting without protection, there are one or more owner nodes 101 of the L pool page corresponding to the target G pool page, and when there are a plurality of owner nodes 101, different data is transmitted to the plurality of nodes 101.

Next, the global pool control unit 141 determines whether to cache the target data (step S83). Whether to cache the target data may be determined based on, for example, statistical information (for example, access pattern and resource using amount) about access to the target area.

As a result, when it is determined that the target data is not to be cached (step S83: No), the global pool control unit 141 ends the processing.

On the other hand, when it is determined that the target data is to be cached (step S83: Yes), the global pool control unit 141 determines whether the own node 101 is the same as the node 101 of the issue source host unit (step S84).

As a result, when the own node 101 of the global pool control unit 141 is the same as the node 101 of the issue source host unit 102 (step S84: Yes), the global pool control unit 141 advances the processing to step S87.

On the other hand, when the own node 101 of the global pool control unit 141 is not the same as the node 101 of the issue source host unit 102 (step S84: No), the global pool control unit 141 requests the host path control unit 121 in the node 101 of the issue source host unit 102 to transmit data to the own node 101 (of the global pool control unit 141) (step S85).

Next, the global pool control unit 141 waits for a processing result from the host path control unit 121 (step S86), and advances the processing to step S87 after receiving the processing result.

In step S87, the global pool control unit 141 updates the cached data of the G pool page using data in the memory or using the write target data acquired in step S86, and ends the processing.

Next, the transfer processing (Write Erasure Coding) (step S64 in FIG. 18) will be described.

Figure 21:
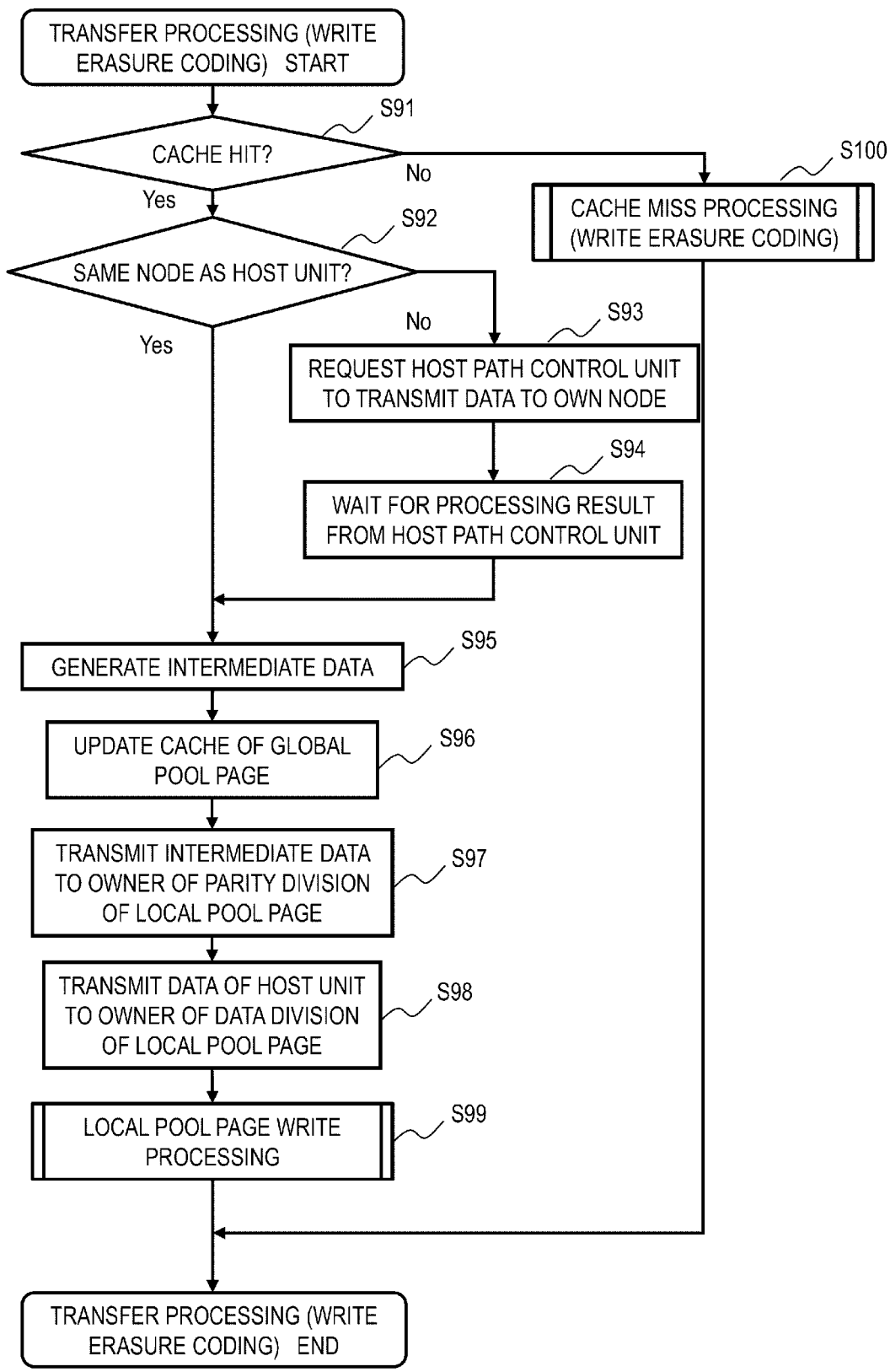
FIG. 21 is a flowchart illustrating a transfer processing (Write Erasure Coding) according to the embodiment.

FIG. 21 is a flowchart illustrating the transfer processing (Write Erasure Coding) according to the embodiment.

The global pool control unit 141 determines whether the data of the target G pool page, as a write target of the command in the processing request, is subjected to a cache hit, that is, whether the data of the target G pool page in the own node 101 is cached (step S91).

As a result, when the data of the target G pool page is subjected to a cache hit (step S91: Yes), the global pool control unit 141 determines whether the own node 101 is the same as the node 101 of the issue source host unit 102 (step S92).

As a result, when the own node 101 of the global pool control unit 141 is the same as the node 101 of the issue source host unit 102 (step S92: Yes), the global pool control unit 141 advances the processing to step S95.

On the other hand, when the own node 101 of the global pool control unit 141 is not the same as the node 101 of the issue source host unit 102 (step S92: No), the global pool control unit 141 requests the host path control unit 121 in the node 101 of the issue source host unit 102 to transmit data to the own node 101 (of the global pool control unit 141) (step S93).

Next, the global pool control unit 141 waits for a processing result from the host path control unit 121 (step S94), and advances the processing to step S95 after receiving the processing result.

In step S95, the global pool control unit 141 generates data (intermediate data) to be used to obtain a parity division after update (new parity division), based on the cached data division before update (old data division) of the G pool page and on a newly received data division (new data division) of the G pool page. As a method of generating intermediate data for obtaining a new parity division using the old data division and the new data division, for example, a method of obtaining a difference (XOR) between data of the old data division and data of the new data division can be used.

Next, the global pool control unit 141 updates the cached data of the G pool page using data in the memory or using the target data acquired in the step S94 (step S96).

Next, the global pool control unit 141 transmits the intermediate data to the local pool control unit 150 in the owner node 101 of the L pool page corresponding to the parity division of the target G pool page (step S97), and transmits the data of the data division to the local pool control unit 150 in the owner node 101 of the L pool page corresponding to the data division of the target G pool page (step S98). The steps S97 and S98 may be performed in parallel.

Next, the global pool control unit 141 executes a local pool page write processing (see FIG. 28) (step S99), and ends the present processing.

On the other hand, when the data of the target G pool page does is not subjected to a cache hit (step S91: No), the global pool control unit 141 executes a cache miss processing (Write Erasure Coding) (see FIG. 22) (step S100), and ends the present processing.

Next, the cache miss processing (Write Erasure Coding) (step S100 in FIG. 21) will be described.

Figure 22:
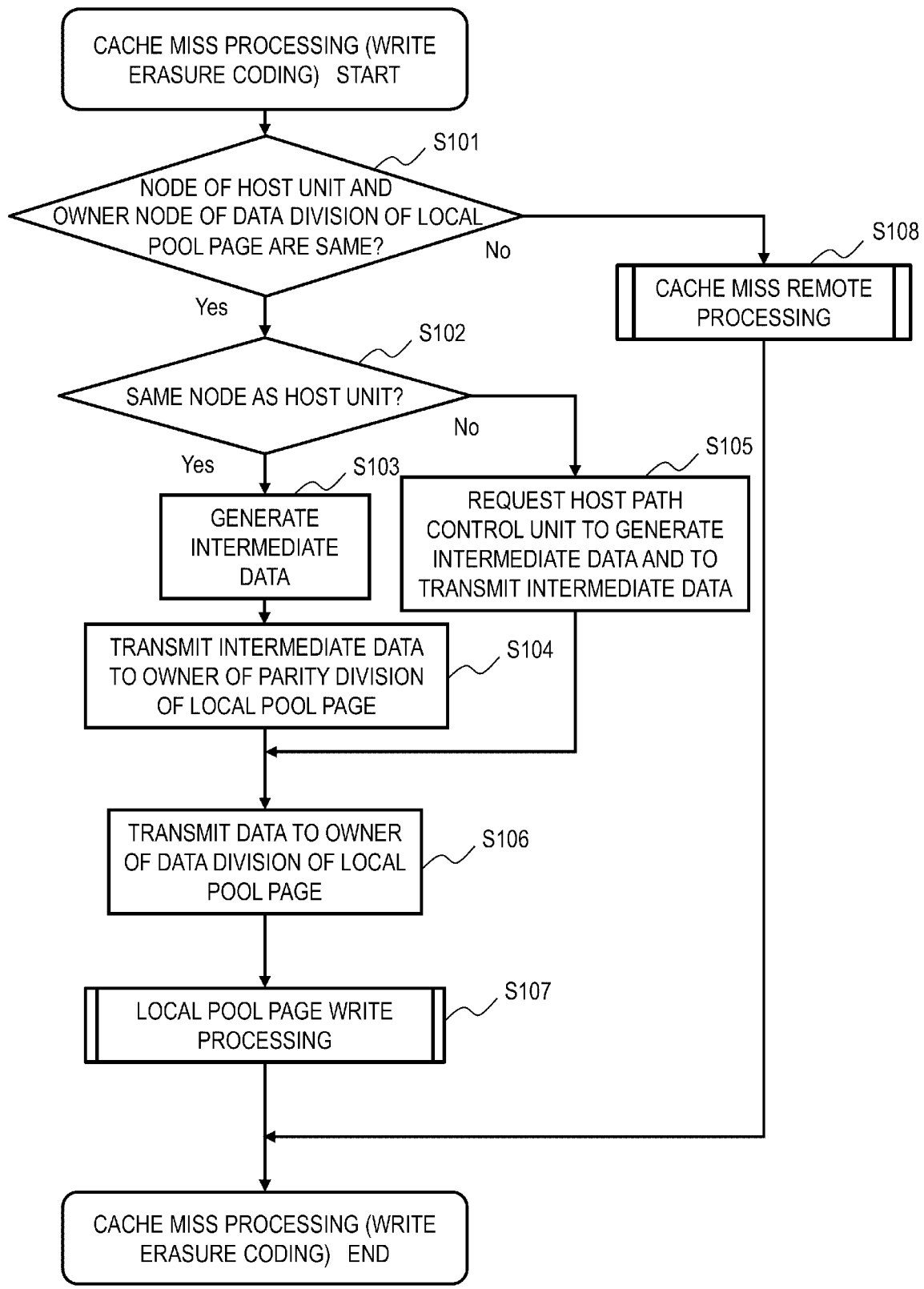
FIG. 22 is a flowchart illustrating a cache miss processing (Write Erasure Coding) according to the embodiment.

FIG. 22 is a flowchart illustrating the cache miss processing (Write Erasure Coding) according to the embodiment.

The global pool control unit 141 determines whether the node 101 of the issue source host unit 102 and the owner node 101 of the L pool page corresponding to the data division of the target G pool page are the same node 101 (step S101).

As a result, when the node 101 of the issue source host unit 102 and the owner node 101 of the L pool page corresponding to the data division of the target G pool page are the same node 101 (step S101: Yes), the global pool control unit 141 determines whether the own node 101 is the same as the node 101 of the issue source host unit 102 (step S102).

As a result, when the own node 101 of the global pool control unit 141 is the same as the node 101 of the issue source host unit 102 (step S102: Yes), the global pool control unit 141 acquires a data division before update (old data division) corresponding to the G pool page from the local pool control unit 150, acquires a newly received data division (new data division) of the G pool page from the host path control unit 121, and generates data (intermediate data) to be used for obtaining a parity division after update (new parity division) based on the old data division and the new data division (step S103).

Next, the global pool control unit 141 transmits the intermediate data to the local pool control unit 150 in the owner node 101 of the L pool page corresponding to the parity division of the target G pool page (step S104), and advances the processing to step S106.

On the other hand, when the own node 101 of the global pool control unit 141 is not the same as the node 101 of the issue source host unit 102 (step S102: No), the global pool control unit 141 requests the host path control unit 121 to acquire the old data division from the local pool control unit 150, to generate the intermediate data using both the new data division and the old data division, and to transmit the generated intermediate data to the local pool control unit 150 in the owner node 101 of the L pool page of the parity division corresponding to the target G pool page (step S105), and advances the processing to step S106.

In step S106, the global pool control unit 141 requests the host path control unit 121 to transmit the data of the new data division of the G pool page to the local pool control unit 150 in the owner node 101 of the L pool page of the data division corresponding to the target G pool page.

Next, the global pool control unit 141 executes a local pool page write processing (see FIG. 28) (step S107), and ends the present processing.

On the other hand, when the node of the issue source host unit and the owner node 101 of the L pool page corresponding to the data division of the write target G pool page are not the same node 101 (step S101: No), the global pool control unit 141 executes a cache miss remote processing (see FIG. 23) (step S108), and ends the present processing.

In the cache miss processing (Write Erasure Coding), the steps S102 to S105 and step S106 may be performed in parallel.

Next, the cache miss remote processing (step S108 in FIG. 22) will be described.

Figure 23:
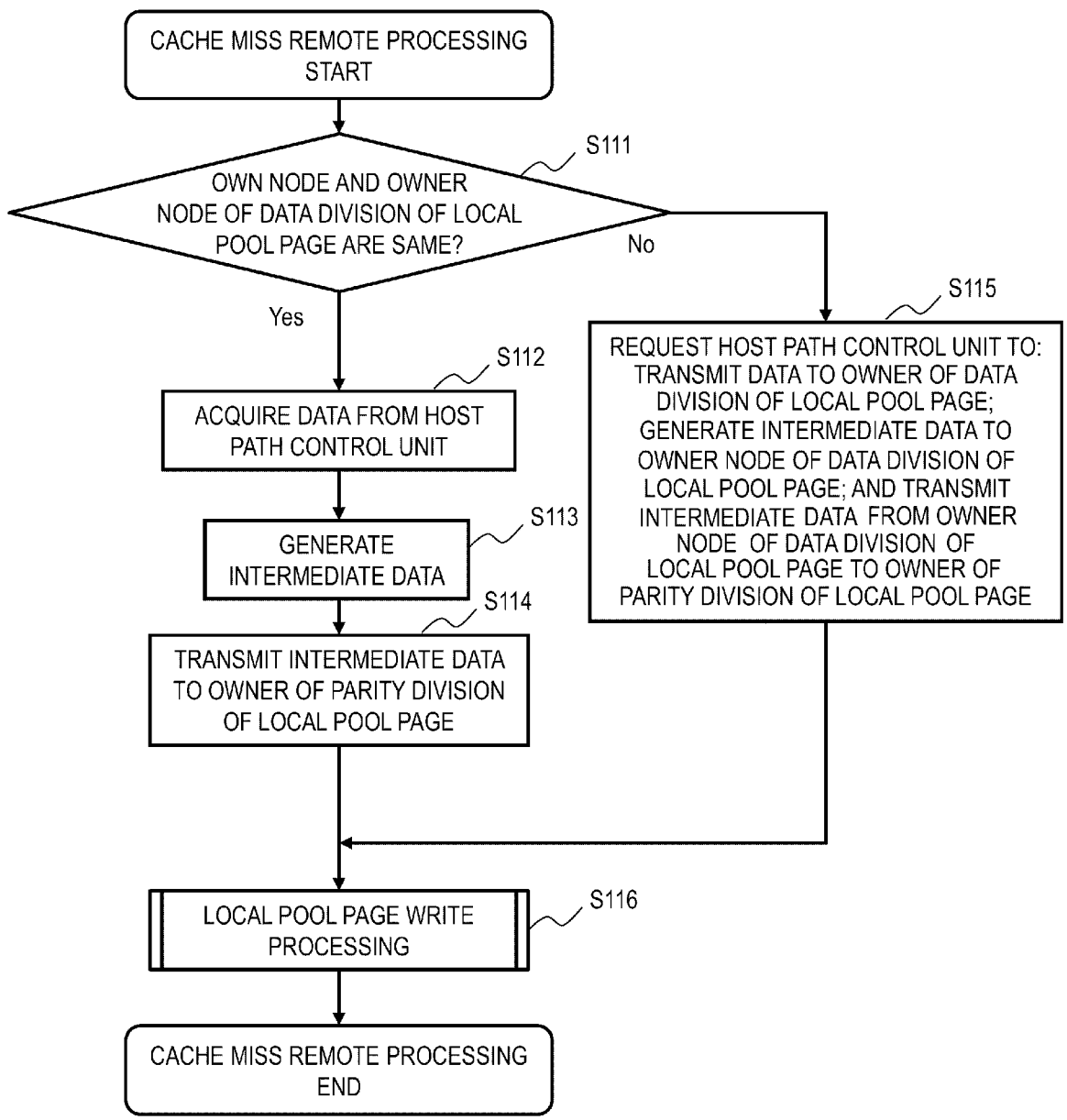
FIG. 23 is a flowchart illustrating a cache miss remote processing according to the embodiment.

FIG. 23 is a flowchart illustrating the cache miss remote processing according to the embodiment.

The global pool control unit 141 determines whether the own node 101 and the owner node 101 of the L pool page corresponding to the data division of the target G pool page are the same node 101 (step S111).

As a result, when the own node 101 of the global pool control unit 141 and the owner node 101 of the L pool page corresponding to the data division of the target G pool page are the same node 101 (step S111: Yes), the global pool control unit 141 acquires a write target data division (new data division) from the host path control unit 12, acquires a data division before update (old data division) corresponding to the G pool page from the local pool control unit 150 in the owner node 101 of the L pool page corresponding to the data division of the G pool page (step S112), and generates intermediate data based on the new data division and the old data division (step S113).

Next, the global pool control unit 141 transmits the intermediate data to the local pool control unit 150 in the owner node 101 of the L pool page corresponding to the parity division of the target G pool page (step S114), and advances the processing to step S116.

On the other hand, when the own node 101 of the global pool control unit 141 and the owner node 101 of the L pool page corresponding to the data division of the target G pool page are not the same node 101 (step S111: No), the global pool control unit 141 requests the host path control unit 121: to transmit the new data division to the local pool control unit 150 in the owner node 101 of the data division of the L pool page; to cause this local pool control unit 150 to generate the intermediate data; and to transmit the intermediate data generated by this local pool control unit 150 to a local pool control unit 150 in the owner node 101 of the parity division of the L pool page (step S115), and advances the processing to step S116.

Figure 28:
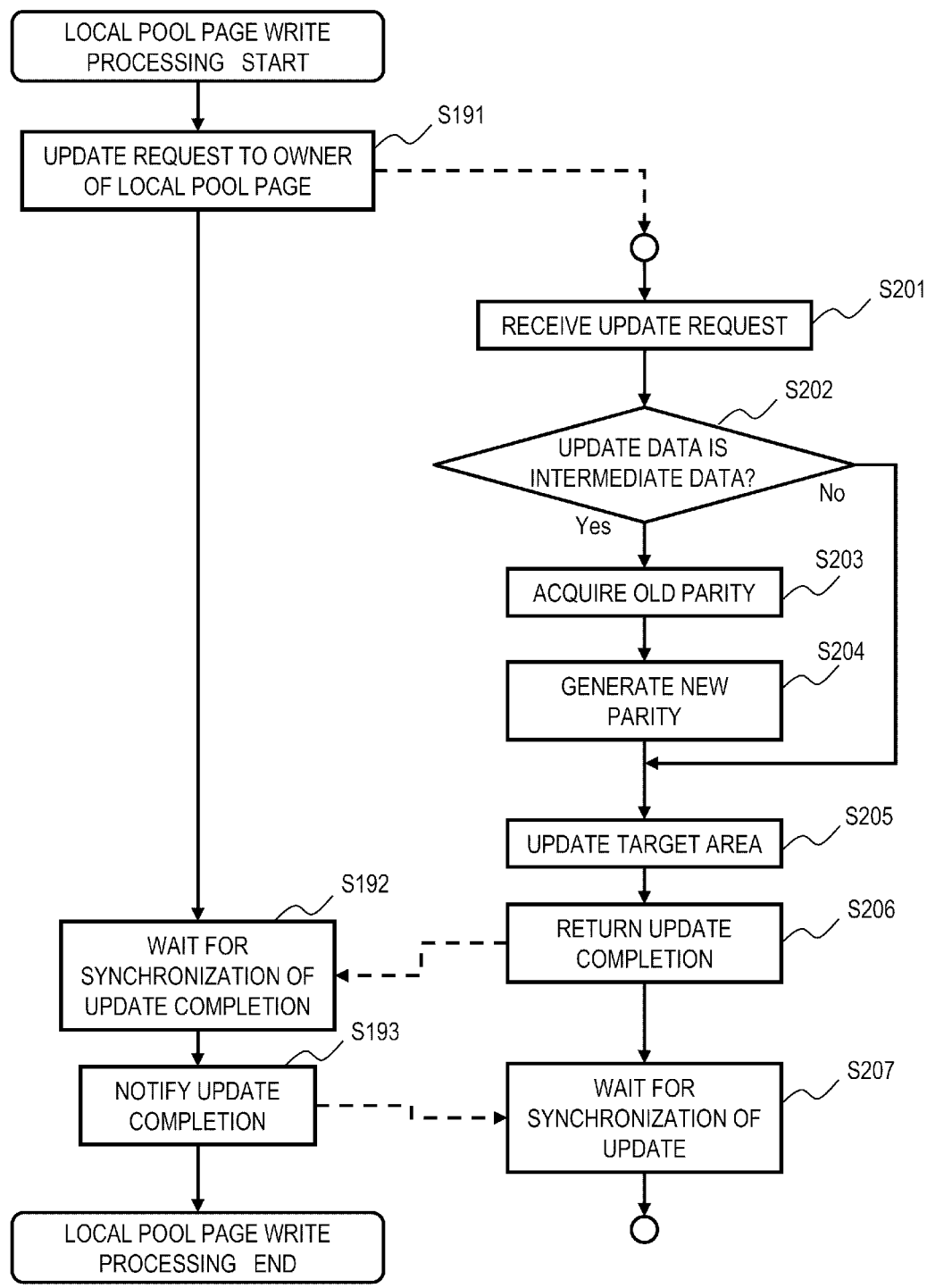
FIG. 28 is a flowchart illustrating a local pool page write processing according to the embodiment.

In step S116, the global pool control unit 141 executes the local pool page write processing (see FIG. 28). Thereafter, the global pool control unit 141 ends the present processing.

Next, the transfer processing (Write Erasure Coding full stripe) (step S65 in FIG. 18) will be described.

Figure 24:
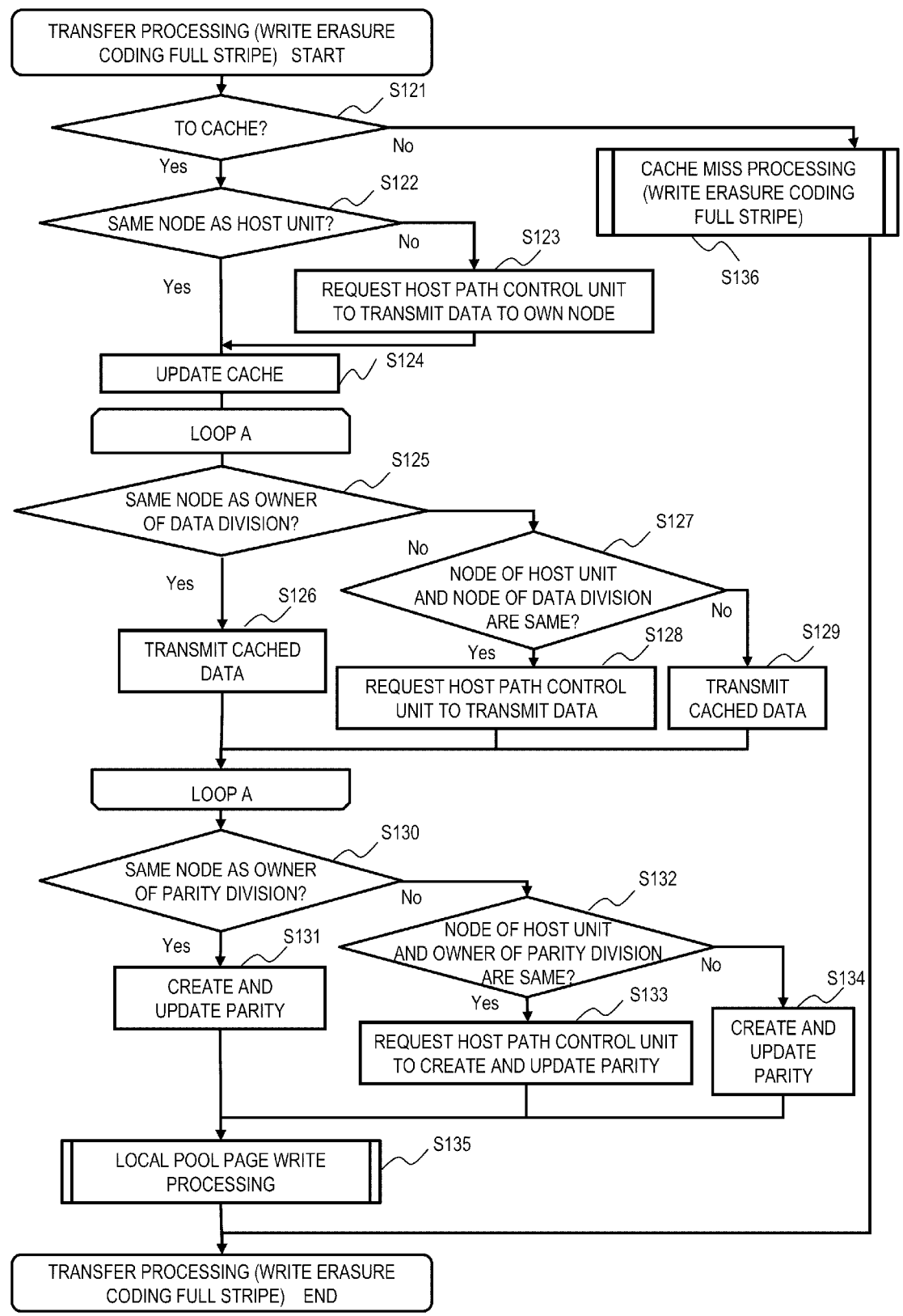
FIG. 24 is a flowchart illustrating a transfer processing (Write Erasure Coding full stripe) according to the embodiment.

FIG. 24 is a flowchart illustrating the transfer processing (Write Erasure Coding full stripe) according to the embodiment.

The global pool control unit 141 determines whether to cache the target data (step S121). Whether to cache the target data may be determined based on, for example, statistical information (for example, access pattern and resource using amount) about access to the target area.

As a result, when the target data is to be cached (step S121: Yes), the global pool control unit 141 determines whether the own node 101 is the same as the node 101 of the issue source host unit 102 (step S122).

As a result, when the own node 101 of the global pool control unit 141 is the same as the node 101 of the issue source host unit 102 (step S122: Yes), the global pool control unit 141 advances the processing to step S124.

On the other hand, when the own node 101 of the global pool control unit 141 is not the same as the node 101 of the issue source host unit 102 (step S122: No), the global pool control unit 141 requests the host path control unit 121 in the node 101 of the issue source host unit 102 to transmit the target data to the own node 101 (of the global pool control unit 141) (step S123), and advances the processing to step S124.

In step S124, the global pool control unit 141 caches the target data in the memory or acquired in step S123.

Next, the global pool control unit 141 executes a loop A processing (steps S124 to S129) for each data division of the target G pool page. Here, a target data division of the loop A processing is referred to as a processing target data division.

In loop A, the global pool control unit 141 determines whether the own node 101 and an owner node 101 (of a local pool control unit 150) of the processing target data division are the same node 101 (step S125).

As a result, when the own node 101 of the global pool control unit 141 and the owner node 101 (of the local pool control unit 150) of the processing target data division are the same node 101 (step S125: Yes), the global pool control unit 141 transmits the cached target data to the local pool control unit 150 in the owner node 101 of the processing target data division (step S126).

On the other hand, when the own node 101 and the node 101 (of the local pool control unit 150) of the processing target data division are not the same node 101 (step S125: No), the global pool control unit 141 determines whether the node of the issue source host unit 102 and an owner node 101 of an L pool page corresponding to the processing target data division is the same node 101 (step S127).

As a result, when the node of the issue source host unit and the owner node 101 of the L pool page corresponding to the processing target data division are the same node 101 (step S127: Yes), the global pool control unit 141 requests the host path control unit 121 to transmit the target data to the local pool control unit 150 in the owner node 101 of the processing target data division (step S128). In this case, since the target data is transmitted via intra-node communication, the processing efficiency is good.

On the other hand, when the node of the issue source host unit and the owner node 101 of the L pool page corresponding to the processing target data division are not the same node 101 (step S127: No), the global pool control unit 141 transmits the cached target data to the local pool control unit 150 in the owner node 101 of the processing target data target (step S129).

When all data divisions of the target G pool page have been subjected to the loop A processing as targets, the global pool control unit 141 exits loop A.

Next, the global pool control unit 141 determines whether the own node 101 and an owner node 101 (a certain node including the local pool control unit 150) of a parity division (target parity division) corresponding to the target data are the same node (step S130).

As a result, when the own node 101 and the owner node 101 of the target parity division are the same node 101 (step S130: Yes), the global pool control unit 141 creates a parity based on the cached target data, transmits the created parity to the local pool control unit 150 in the owner node 101 of the target parity division and stores the created parity therein (step S131), and advances the processing to step S135.

On the other hand, when the own node 101 and the owner node 101 of the target parity division are not the same node (step S130: No), the global pool control unit 141 determines whether the node of the issue source host unit and the owner node 101 of the L pool page corresponding to the parity division of the target G pool page are the same node 101 (step S132).

As a result, when the node of the issue source host unit and the owner node 101 of the L pool page corresponding to the parity division of the target G pool page are the same node 101 (step S132: Yes), the global pool control unit 141 requests the host path control unit 121 to create a parity based on the target data of the host path control unit 121, and to transmit the created parity to the local pool control unit 150 in the owner node 101 of the target parity division (step S133), and advances the processing to step S135. In this case, since the created parity is transmitted via intra-node communication, the processing efficiency is good.

On the other hand, when the node of the issue source host unit and the owner node 101 of the L pool page corresponding to the parity division of the target G pool page are not the same node 101 (step S132: No), the global pool control unit 141 creates a parity based on the cached target data, transmits the created parity to the local pool control unit 150 in the owner node 101 of the target parity division and stores the created parity therein (step S134), and advances the processing to step S135.

In step S135, the global pool control unit 141 executes the local pool page write processing (see FIG. 28). Thereafter, the global pool control unit 141 ends the present processing.

Next, the cache miss processing (Write Erasure Coding full stripe) (step S136 in FIG. 24) will be described.

Figure 25:
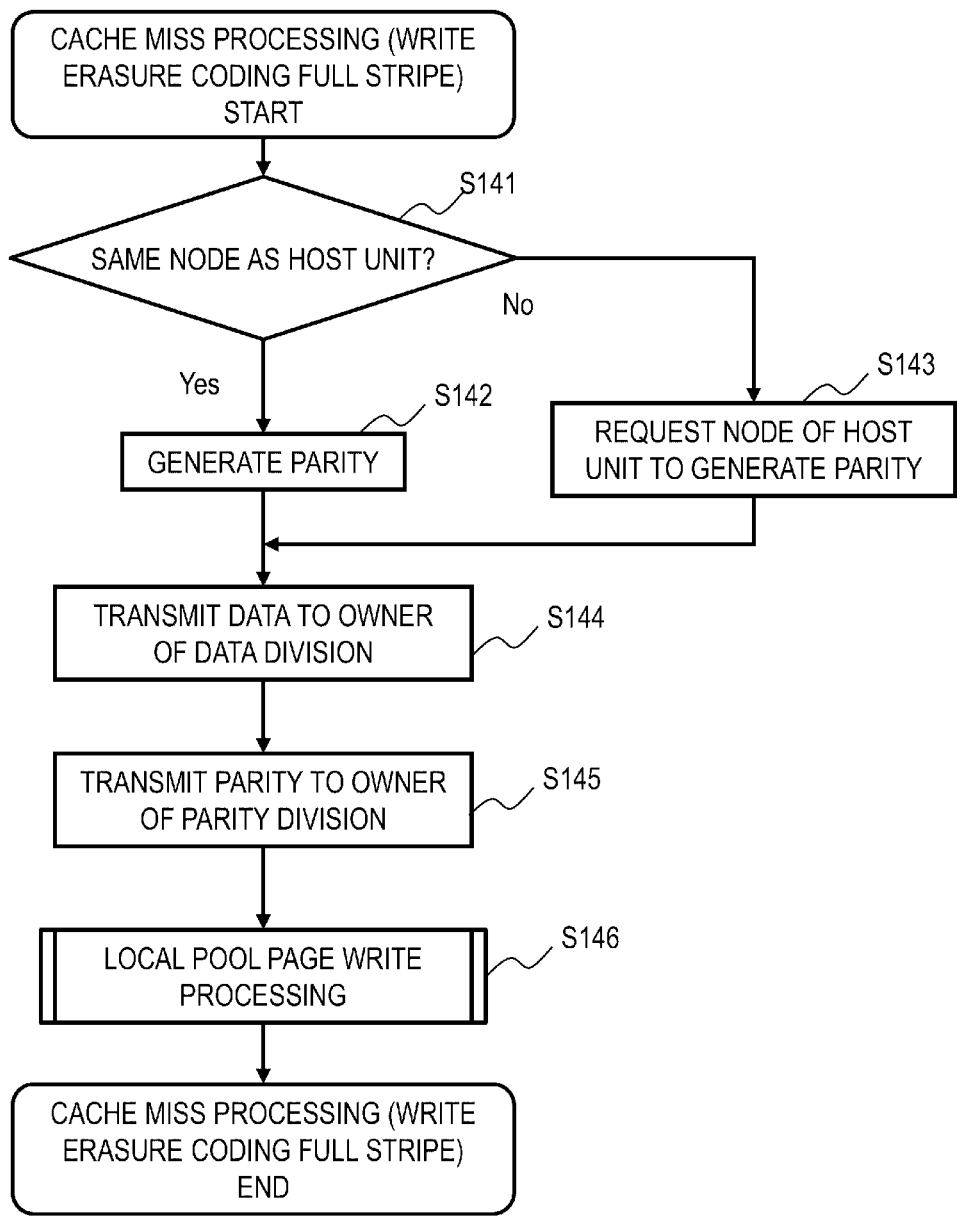
FIG. 25 is a flowchart illustrating a cache miss processing (Write Erasure Coding full stripe) according to the embodiment.

FIG. 25 is a flowchart illustrating the cache miss processing (Write Erasure Coding full stripe) according to the embodiment.

The global pool control unit 141 determines whether the own node 101 is the same as the node 101 of the issue source host unit 102 (step S141).

As a result, when the own node 101 of the global pool control unit 141 is the same as the node 101 of the issue source host unit 102 (step S141: Yes), the global pool control unit 141 receives the target data from the host path control unit 121 to generate a parity (step S142), and advances the processing to step S144. In this processing, since the target data can be acquired in the node 101 to generate the parity, the processing efficiency is good.

On the other hand, when the own node 101 of the global pool control unit 141 is not the same as the node 101 of the issue source host unit 102 (step S141: No), the global pool control unit 141 requests the host path control unit 121 to generate a parity based on the target data (step S143), and advances the processing to step S144. In this case, since the target data can be acquired in a certain node including the host path control unit 121 to generate the parity, the processing efficiency is good.

In step S144, the global pool control unit 141 transmits the target data to the local pool control unit 150 in the owner node 101 of the data division. When the own node 101 of the global pool control unit 141 is not the same as the node 101 of the issue source host unit 102, the global pool control unit 141 causes the host path control unit 121 of the issue source host unit 102 to transmit the target data.

Next, the global pool control unit 141 transfers the generated parity to the local pool control unit 150 in the owner node 101 of the parity division (step S145). When the own node 101 of the global pool control unit 141 is not the same as the node 101 of the issue source host unit 102, the global pool control unit 141 causes the host path control unit 121 of the issue source host unit 102 to transmit the parity.

Next, the global pool control unit 141 executes the local pool page write processing (see FIG. 28) (step S146), and ends the present processing.

Next, the transfer processing of the local pool control unit will be described.

Figure 26:
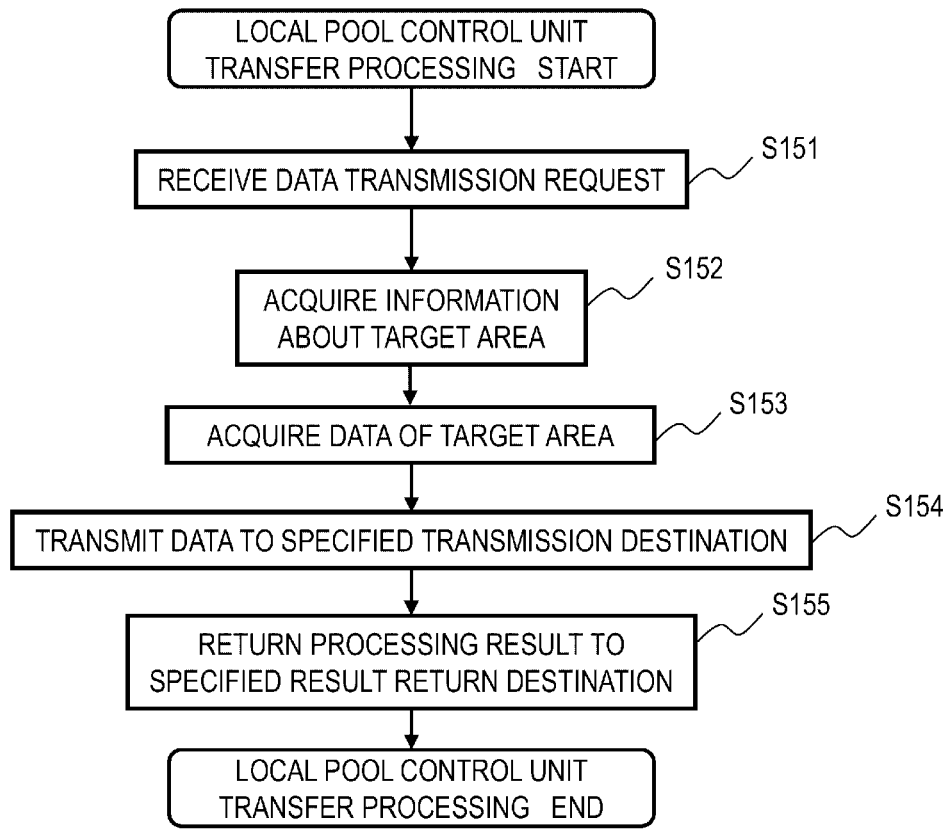
FIG. 26 is a flowchart illustrating a transfer processing of a local pool control unit according to the embodiment.

FIG. 26 is a flowchart illustrating the transfer processing of the local pool control unit according to the embodiment.

The transfer processing of the local pool control unit 150 is executed when a request of data transmission (data transmission request) is issued to the local pool control unit 150 (for example, in steps S45, S52, S56 and S106).

When receiving the data transmission request (step S151), the local pool control unit 150 acquires information about a request target area (target area) (step S152). Specifically, the local pool control unit 150 refers to the local pool management table 206, specifies an L pool page of the target area, and acquires information (drive 112, start address, and size) about the target area corresponding to the L pool page.

Next, the local pool control unit 150 acquires target data from the drive 112 based on the information about the target area (step S153), and transmits the acquired target data to a transmission destination specified in the data transmission request (step S154). The transmission destination is the host path control unit 121 or the global pool control unit 141.

Next, the local pool control unit 150 returns a processing result to a result return destination specified in the data transmission request (step S155), and ends the processing. The result return destination is basically the global pool control unit 141.

According to the transfer processing of the local pool control unit 150, data can be transmitted to the transmission destination specified in the data transmission request, and the processing result can be returned to the result return destination specified in the data transmission request.

Next, a transfer processing of the host path control unit 121 will be described.

Figure 27:
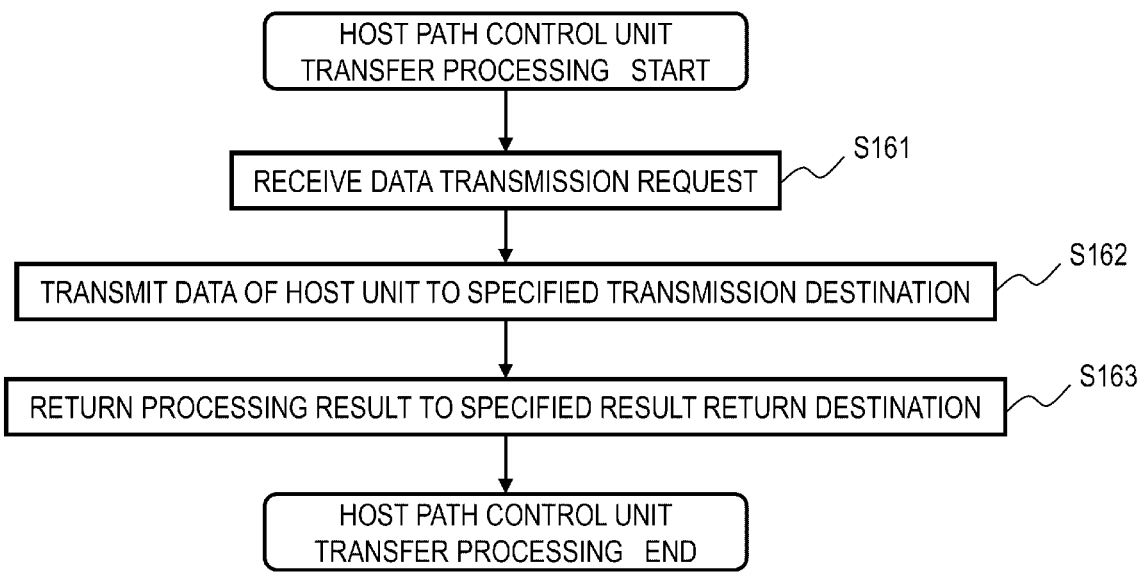
FIG. 27 is a flowchart illustrating a transfer processing of the host path control unit according to the embodiment.

FIG. 27 is a flowchart illustrating the transfer processing of the host path control unit according to the embodiment.

The transfer processing of the host path control unit 121 is executed when a request of data transmission (data transmission request) is issued to the host path control unit 121 (for example, in steps S1, S73, S81, S85, S93, S105, S123, and S128).

When receiving the data transmission request (step S161), the host path control unit 121 acquires the target data from a memory and transmits the target data to a transmission destination specified in the data transmission request (step S162). The transmission destination is the host path control unit 121 or the global pool control unit 141.

Next, the host path control unit 121 returns a processing result to a result return destination specified in the data transmission request (step S163), and ends the processing. The result return destination is basically the global pool control unit 141.

According to the transfer processing of the host path control unit 121, the data can be transferred to the transmission destination specified in the data transmission request, and the processing result can be returned to the result return destination specified in the data transmission request.

Next, the local pool page write processing (steps S79, S82, S99, S107, S116, S136, and S146) will be described.

FIG. 28 is a flowchart illustrating the local pool page write processing according to the embodiment.

The global pool control unit 141 issues an update request for data of a write target L pool page to the local pool control unit 150 in the owner node 101 of the write target L pool page (step S191), waits for synchronization of update completion, that is, waits for return of update completion from all local pool control units 150 constituting a set of the inter-node data protection setting in step S206 to be described below (step S192), notifies the local pool control unit 150 of update completion when update completion from all local pool control units 150 constituting the set of the inter-node data protection setting is returned (step S193), and ends the processing. In the present embodiment, data management is performed so as to be able to return to a state before update, and if synchronization of update completion is not obtained, the state before update is restored. In step S191, when the protection setting is Mirroring, there are a plurality of owner nodes 101 of the L pool page corresponding to the write target G pool page; meanwhile, when the protection setting is setting without protection, there are one or more owner nodes 101 of the L pool page corresponding to the write target G pool page.

On the other hand, when receiving the update request (step S201), the local pool control unit 150 in the owner node 101 of the write target L pool page, which is a request destination of the update request issued in step S191, determines whether target data of the update request is intermediate data (step S202).

As a result, when the target data of the update request is the intermediate data (step S202: Yes), the local pool control unit 150 acquires an old parity from the drive 112 (step S203), generates a new parity based on the intermediate data and the old parity (step S204), and advances the processing to step S205.

On the other hand, when the target data of the update request is not the intermediate data (step S202: No), the local pool control unit 150 advances the processing to step S205.

In step S205, the local pool control unit 150 updates the target area of the drive 112 using received data (the new parity when the new parity is generated).

Next, the local pool control unit 150 returns update completion to the global pool control unit 141 that has issued the update request (step S206), waits for a notification of update completion by the global pool control unit 141 in step S193 (step S207), and ends the processing on the local pool control unit 150 side when the notification of update completion is received. In the present embodiment, data management is performed so as to be able to return to the state before update, and if the notification of update completion is not obtained, the drive 112 is returned to the state before update.

Next, an intermediate data generation processing of the host path control unit 121 will be described.

Figure 29:
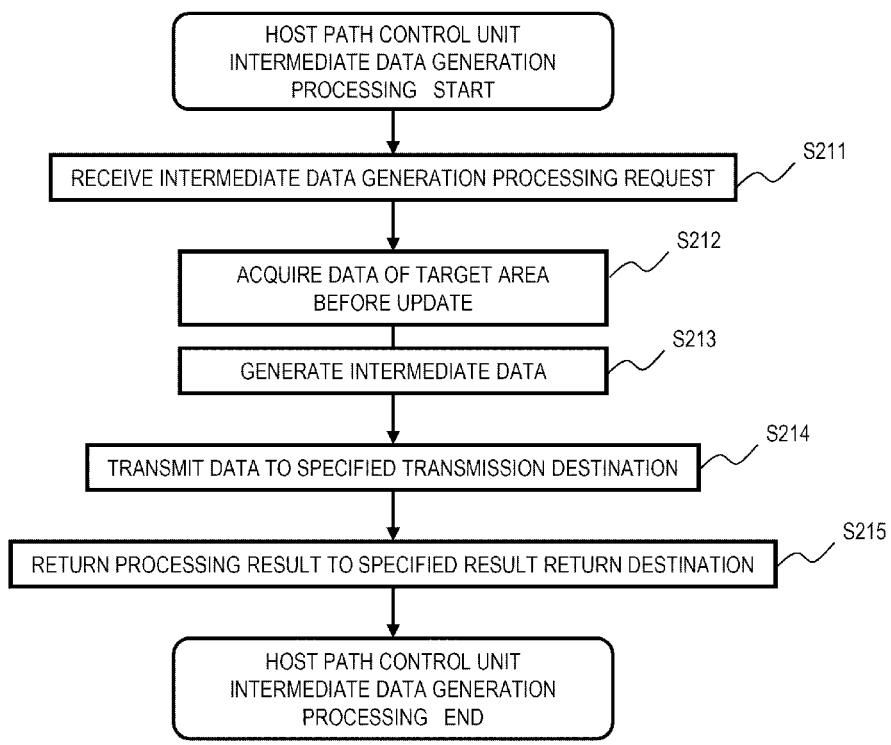
FIG. 29 is a flowchart illustrating an intermediate data generation processing of the host path control unit according to the embodiment.

FIG. 29 is a flowchart illustrating the intermediate data generation processing of the host path control unit according to the embodiment.

The intermediate data generation processing of the host path control unit 121 is executed when a processing request (intermediate data generation processing request) for intermediate data generation is received in step S105 of FIG. 22. When this processing is executed, the node 101 of the host path control unit 121 and the owner node 101 of the data division of the write target area are the same node 101.

When receiving the intermediate data generation processing request (step S211), the host path control unit 121 acquires data before update (old data) of the target area from the local pool control unit 150 in the own node 101 (step S212). In this way, the data before update can be acquired from the own node, and thus the efficiency is good.

Next, the host path control unit 121 acquires data after update from the host unit 102 (or the memory 110), and generates intermediate data based on the data before update and the data after update (Step S213).

Next, the host path control unit 121 transmits the generated intermediate data to a transmission destination specified in the intermediate data generation processing request (step S214). The transmission destination is the host path control unit 121 or the global pool control unit 141.

Next, the host path control unit 121 returns a processing result to a result return destination specified in the intermediate data generation processing request (step S215), and ends the processing. The result return destination is basically the global pool control unit 141.

According to this intermediate data generation processing, since the intermediate data can be generated by collecting data necessary for generating the intermediate data through intra-node transfer in the node 101 of the host path control unit 121, the processing efficiency is good.

Next, the intermediate data generation processing of the local pool control unit 150 will be described.

Figure 30:
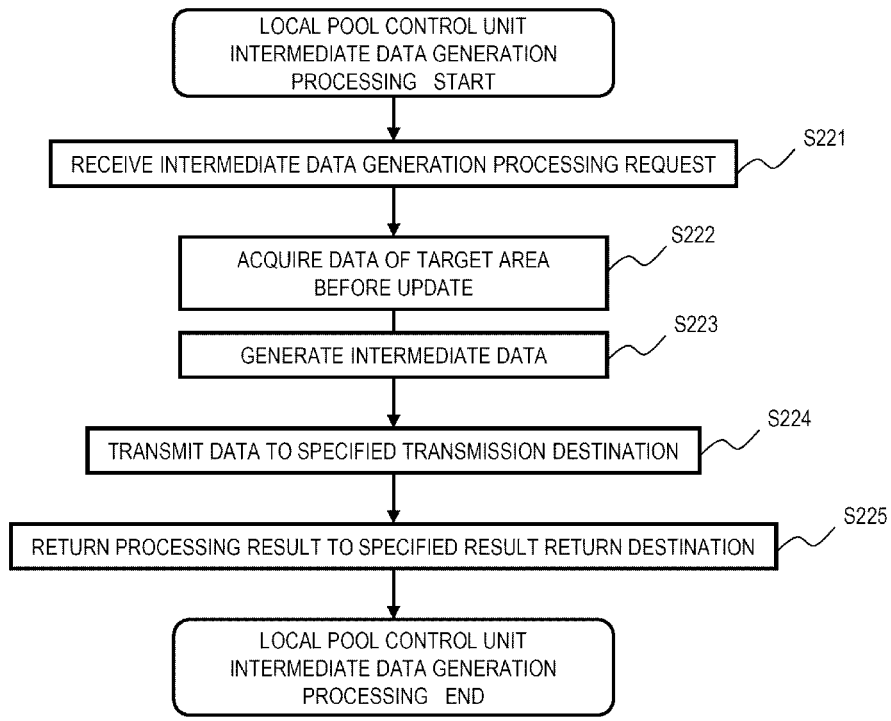
FIG. 30 is a flowchart illustrating an intermediate data generation processing of the local pool control unit according to the embodiment.

FIG. 30 is a flowchart illustrating the intermediate data generation processing of the local pool control unit according to the embodiment.

The intermediate data generation processing of the local pool control unit 150 is executed when there is a processing request (intermediate data generation processing request) for intermediate data generation from the host path control unit 121 due to the request in step S115 in FIG. 23. When this processing is executed, the node 101 of the local pool control unit 150 and the owner node 101 of the data division of the write target area are the same node. In this case, the intermediate data generation processing request is issued along with the transmission of the target data (data after update).

When receiving the intermediate data generation processing request (step S221), the local pool control unit 150 receives data of the target area after update, and acquires data before update (old data) of the target area from the drive 112 (step S222). In this way, the data before update can be acquired from the drive 112 by the local pool control unit 150, and thus the efficiency is good.

Next, the local pool control unit 150 generates intermediate data based on the data after update and the data before update (Step S223).

Next, the local pool control unit 150 transmits the generated intermediate data to a transmission destination specified in the intermediate data generation processing request (step S224). The transmission destination is the host path control unit 121 or the global pool control unit 141.

Next, the local pool control unit 150 returns a processing result to a result return destination specified in the intermediate data generation processing request (step S225), and ends the processing. The result return destination is basically the global pool control unit 141.

According to this intermediate data generation processing, since the intermediate data can be generated by collecting data necessary for generating the intermediate data through intra-node transfer in the node 101 of the local pool control unit 150, the processing efficiency is good.

The invention is not limited to the above embodiment, and can be appropriately modified and implemented without departing from the spirit of the invention.

For example, in the read cache miss processing of FIG. 17, only steps S52 and S53 may be executed.

Further, in the above embodiment, a part or all of the processing performed by the processor 111 may be performed by a hardware circuit. In addition, the program in the above embodiment may be installed from a program source. The program source may be a program distribution server or a storage medium (for example, portable storage medium).

What is claimed is:

1. A computer system, comprising:
a plurality of nodes;
a host unit that is formed in at least one of the nodes and issues a request of an I/O processing to a predetermined data management unit;
a plurality of local control units that are respectively formed in a plurality of nodes each including a storage device providing a storage area to the data management unit, and that are each in charge of management of a local logical area based on the storage area of the storage device of each node, respectively; and
a global control unit that is formed in at least one of the nodes, and that is in charge of management of a global logical area based on a plurality of local logical areas allocated to the data management unit that is an I/O processing target of the host unit,
wherein the global control unit controls transmission of target data of the I/O processing performed by the host unit with respect to the data management unit, based on a commonality relationship among a first node that is formed with the host unit performing the I/O processing, a second node that is formed with the global control unit, and a third node that is formed with the local control unit managing the local logical area corresponding to the global logical area.

2. The computer system according to claim 1, wherein the first node, the second node, and the third node are respectively different nodes, and
the global control unit transmits the target data of the I/O processing with respect to the data management unit between the first node and the third node without going through the second node.

3. The computer system according to claim 2, wherein the global control unit transmits information indicating a transmission destination node to a transmission source node of the first node or the third node.

4. The computer system according to claim 1, wherein the I/O processing is a read processing for reading data from the data management unit,
the global control unit is configured to execute a caching processing with respect to the data of the data management unit, and
the global control unit determines whether the first node and the second node are the same node when the target data of the I/O processing is cached, transmits the cached data to a host path control unit of the first node when the first node and the second node are determined to be the same node, determines whether the first node and the third node are the same node when the first node and the second node are determined to be not the same node, and causes the local control unit to transmit data to the host path control unit of first node when the first node and the third node are determined to be the same node.

5. The computer system according to claim 1, wherein
the I/O processing is a read processing for reading data from the data management unit,
the global control unit is configured to execute a caching processing with respect to data of the data management unit, and
the global control unit causes the local control unit to transmit data from the third node to the first node when the target data of the I/O processing is not cached.

6. The computer system according to claim 1, wherein
the I/O processing is a write processing for writing data to the data management unit,
a predetermined unit area of the global logical area is stored and managed in one or more local logical areas,
the global control unit is configured to execute a caching processing with respect to data of the data management unit, and
the global control unit determines whether the second node and the first node are the same node when old data in a target area of the I/O processing is cached, and acquires and caches the target data from the host unit and transmits the target data to one or more third nodes in which the local logical area is managed when the second node and the first node are determined to be the same node.

7. The computer system according to claim 6, wherein
the global control unit transmits the target data from the first node to the third node when the second node and the first node are determined to be not the same node.

8. The computer system according to claim 1, wherein
the I/O processing is a write processing for writing data to the data management unit,
a predetermined unit area of the global logical area is redundantly managed by Erasure Coding in a plurality of local logical areas,
the global control unit is configured to execute a caching processing with respect to data of the data management unit, and
the global control unit determines whether the second node and the first node are the same node when a target area of the I/O processing is a partial area of a data division of a stripe of Erasure Coding and old data in the target area is cached, and when the second node and the first node are determined to be the same node, generates intermediate data for generating a parity of a parity division in the stripe based on new data in a target area of the same node and the cached old data, transmits the intermediate data to a local control unit managing the parity division, and transmits the new data to a plurality of local control units managing the data division.

9. The computer system according to claim 8, wherein
the global control unit, when the second node and the first node are not the same node, transmits the new data from the first node to the second node, and generates intermediate data for generating the parity of the parity division in the stripe based on the transmitted new data and the cached old data.

10. The computer system according to claim 1, wherein
the I/O processing is a write processing for writing data to the data management unit, a predetermined unit area of the global logical area is redundantly managed by Erasure Coding in a plurality of local logical areas,
the global control unit is configured to execute a caching processing with respect to data of the data management unit, and
the global control unit
caches new data in a target area of the I/O processing, which is the whole area of a data division of a stripe of Erasure Coding, and
when each third node of a plurality of local control units managing the data division of the stripe and the second node are the same node, transmits data corresponding to the data division in the cached new data of the target area; when the third node and the second node are not the same node and the first node and the third node are the same node, transmits data corresponding to the data division in the new data of the target area from a host path control unit of the first node.

11. The computer system according to claim 10, wherein
the global control unit creates a parity from the cached new data of the target area and transmits the parity to the third node of the local control unit managing the parity division of the stripe when the second node and the third node of the local control unit managing the parity division of the stripe are the same node; and generates a parity from the new data in the first node and transmits the parity to the third node of the local control unit managing the parity division of the stripe when the second node and the third node of the local control unit managing the parity division of the stripe are not the same node and the first node and the third node are the same node.

12. The computer system according to claim 1, wherein
the host unit is movable to another node.

13. The computer system according to claim 1, wherein
another global logical area managed by another global control unit is configured to be capable of being allocated to the data management unit, and another local logical area managed by another local control unit is configured to be capable of being allocated to the global logical area allocated to the data management unit.

14. A data management method performed by a computer system including a plurality of nodes, wherein
the computer system includes:
a host unit that is formed in at least one of the nodes and issues a request of an I/O processing to a predetermined data management unit;
a plurality of local control units that are formed in a plurality of nodes each including a storage device providing a storage area to the data management unit, and that are each in charge of management of a local logical area based on the storage area of the storage device of each node, respectively; and
a global control unit that is formed in at least one of the nodes,
the data management method comprising the steps of:
managing, by the global control unit, a global logical area, based on a plurality of local logical areas allocated to the data management unit that is an I/O processing target of the host unit; and
controlling, by the global control unit, transmission of target data of the I/O processing performed by the host unit with respect to the data management unit, based on a commonality relationship among a first node that is formed with the host unit performing the I/O processing, a second node that is formed with the global control unit, and a third node that is formed with the local control unit managing the local logical area corresponding to the global logical area.

15. The computer system according to claim 1, wherein the data management unit is a volume, a logical unit or an object.

16. The data management method according to claim 14, wherein the data management unit is a volume, a logical unit or an object.

* * * * *